April 9, 1968 B. F. BURCH, JR., ET AL 3,377,622
HIGH SPEED PRINTER SYSTEM INCLUDING RECIRCULATING
DATA AND ADDRESS REGISTERS
Filed April 20, 1965 15 Sheets-Sheet 1

April 9, 1968   B. F. BURCH, JR., ET AL   3,377,622
HIGH SPEED PRINTER SYSTEM INCLUDING RECIRCULATING
DATA AND ADDRESS REGISTERS
Filed April 20, 1965   15 Sheets-Sheet 13

United States Patent Office 3,377,622
Patented Apr. 9, 1968

3,377,622
HIGH SPEED PRINTER SYSTEM INCLUDING RECIRCULATING DATA AND ADDRESS REGISTERS
Byron F. Burch, Jr., Scottsdale, and Wesley W. Bradshaw, Jr., Phoenix, Ariz., assignors to General Electric Company, a corporation of New York
Filed Apr. 20, 1965, Ser. No. 449,406
23 Claims. (Cl. 340—172.5)

ABSTRACT OF THE DISCLOSURE

A printer system adapted for use in electronic data processing systems employing random address buffering of data to be printed further includes means for selectively varying the format of the data print out.

---

The present invention pertains to printer systems, and more particularly, to printer systems of the type intended for use with data processing and associated peripheral equipment.

Peripheral equipment normally used with data processing systems is, of necessity, considerably slower than the operating speeds of the processor. To efficiently utilize the time of the data processing system, it is customary for the system to simultaneously operate a number of peripheral systems. It is therefore obvious that the efficiency of the entire data processing system, including the peripheral systems, may be greatly improved through the use of peripheral systems having substantially increased information handling speeds. Printer systems normally used with data processing systems are therefore required to print at high rates of speed while nevertheless providing a print output of acceptable quality. Even in those instances where the printer system is operating "off-line" (operating through the control of another peripheral system rather than the central data processor), speed is a determining factor in the time efficiency of information handling since the printer is inherently slower than the most common peripheral to which it is connected for off-line operation—a magnetic tape unit.

In view of the disparity between the information handling rates of the central processor of a data processing system and the printer system, prior art printer systems have gone to great lengths to provide the necessary storage of information from the central processor or external user system to enable the external system to return to its processing tasks while leaving the printer system to appropriately manipulate the data for printing. Prior art buffering schemes used in printer systems have usually represented a sizable portion of the printer cost. Quite frequently a compromise is made between the information handling capacity of the printer system and the size and cost of a buffer necessary to attain that capacity. In an attempt to reduce the cost of the printer storage system, some prior art printing systems have utilized a delay line storage arrangement wherein the incoming character codes from the external user system are placed upon and recirculated through the delay line. While the cost is substantially reduced through the utilization of such a delay line, several disadvantages accompany the reduction in cost, not the least of which is the reduction in access time to the delay line since the characters placed on the line must be in the proper sequence for printing. A character received from an external user system must then wait in a register, or other temporary storage media, until its proper time position on the delay line is reached. Since the delay line is a recirculating storage media, the incoming character code may have to wait for the entire storage time of the delay line before the designated delay line location is reached for insertion of the print line character. Another significant disadvantage of prior art printing systems is the requirement that in those print columns requiring a "space" the external user system must provide a code to the printer system for each space that is to be placed in the print line. Since printer systems used with data processing equipment frequently are required to print spaced-apart information, such as columns of figures wherein large spaces are provided between adjacent columns, the external user system is required to provide a relatively large number of command characters to the print system to achieve the necessary spacing. The requirement of this control over the printer system by the data processor consumes the time of both the processing system as well as the printer system.

In an attempt to achieve higher speeds in the mechanical printing operation of the printer system, the utilization of a rotating drum having characters thereon has been found useful. These printer drums characteristically have a plurality of print columns, each comprising an annular arrangement of print characters. The characters are thus arranged in columns and all like characters are arranged adjacent to each other so that as the print drum rotates succeeding rows of like characters are presented to a row of print hammers. A print ribbon and the paper are interposed between the hammers and the rotating drum; since the hammer must strike the ribbon and paper against a rotating drum, and since the drum carries the character form, the timing of the hammer as it strikes the drum becomes critical. All hammers must strike the drum at precisely the same moment relative to the surface position of the drum. The hammers must also be aligned and positioned to insure that each character, as it is printed, is in proper alignment with other characters in a given line of print. Prior art printers using rotating drums have required expensive adjustment and costly trial-and-error procedures to properly align the print hammers. Further, after a period of use, the hammers frequently need realignment with the subsequent requirement of additional time to follow the procedure of print hammer alignment.

Accordingly, it is an object of the present invention to provide a printed system having a recirculating-type buffer system for storing character codes.

It is another object of the present invention to provide a printer system having a recirculating-type data buffer that can receive character codes at a greater rate than prior art printer systems having recirculating buffers.

It is still another object of the present invention to provide a printer system having a low-cost buffer system for receiving and asynchronously storing character codes from an external user system.

It is still another object of the present invention to provide a printer system for receiving and storing character codes from an external user system through the use of synchronized delay lines.

It is another object of the present invention to provide a printer system having means responsive to a unique code sequence for inserting a plurality of spaces in a print line without the necessity of the external user system providing a code for each space to be skipped.

It is still another object of the present invention to provide a printer system responsive to a unique code grouping to permit the insertion of spaces in a print line in response to the content of a portion of the code indicating that spaces are to be skipped.

It is another object of the present invention to provide a printer system of the type having a print drum and hammers and having means for conveniently checking character alignment so that the hammers may readily be aligned.

It is still another object of the present invention to provide a printer system wherein a repetitive pattern of characters may be printed in a test mode to facilitate alignment of the print hammers.

Other objects and advantages of the present invention will become apparent to those skilled in the art as the description thereof proceeds.

The printer system of the present invention accomplishes the objects set forth above through a unique combination of buffering, decoding, and address counting. Briefly, in accordance with one embodiment of the present invention, two recirculating delay lines are provided, each having a register in series therewith for inserting coded words in the delay line. One of the delay lines is intended primarily for the storage of data or print line characters; the other delay line is intended for the storage of addresses. The two delay lines are synchronized so that any particular character circulating in a data delay line will be contained in the serially connected data register at the time that the corresponding address for that data character is contained in the address register serially connected in the address delay line. The addresses of data characters being placed into the data delay line are derived from an address counter which is incremented for each character received; however, in those instances where several spaces are to be inserted in a print line, a special character decode network is utilized to recognize a particular code sequence. The code sequence includes a "skip count" command which contains, in the least significant bit positions thereof, a coded configuration for forcing the address counter to skip counts in multiples of eight. In this manner, as many as 120 spaces may be inserted in a print line having a total of 136 columns.

To facilitate the alignment of the print hammers, a repetitive pattern of characters may be forced into the printer system through the use of a plurality of switches coded to force the address counter to increment column addresses in multiples of eight rather than the normal one. Thus, a character may be supplied to the data register and the corresponding address register will receive a sequence of addresses eight columns apart. The next character to be loaded will also be spaced eight characters apart; however, the second character will initially be printed beginning in a different column. In this manner, repetitive sequences of characters may be loaded into the printer system and printed to expedite print hammer alignment.

The printer system of the present invention may more readily be described by reference to the accompanying drawings in which.

Figure 15:
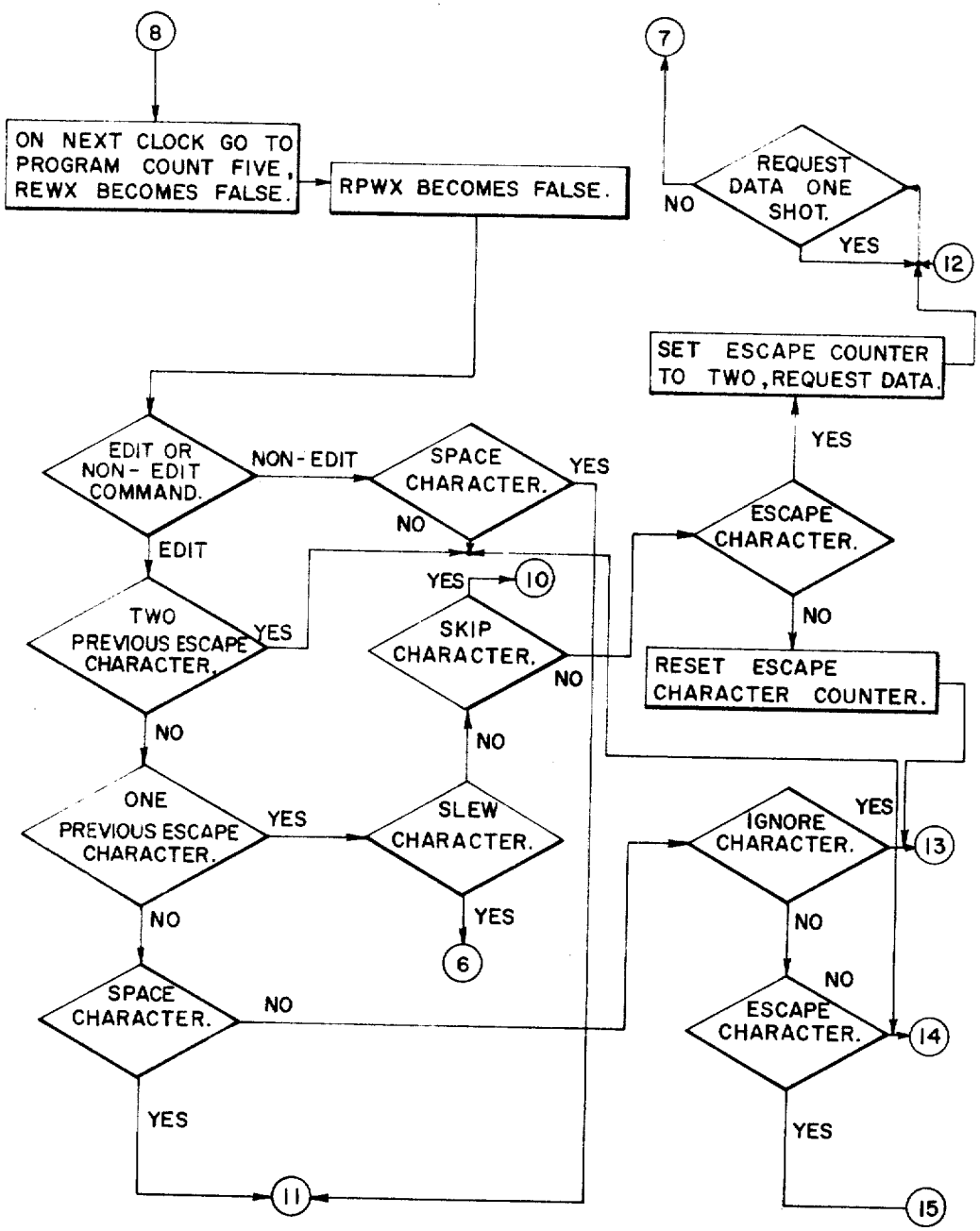
Figure 16:
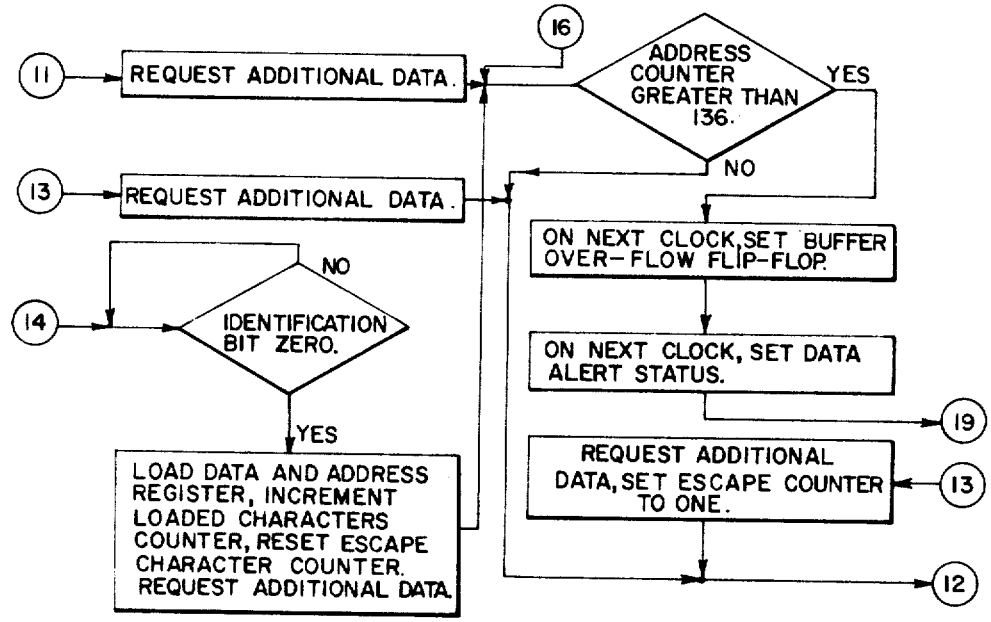
Figure 17:
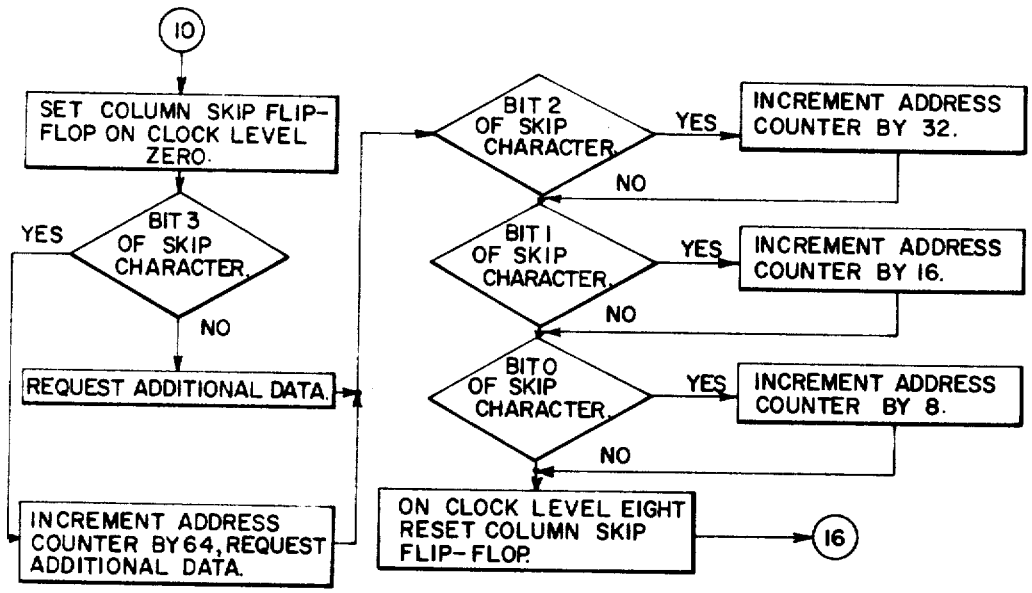

FIGURES 15, 16, and 17 are flow diagrams useful for illustrating the operation of the system of the present invention during program count 5.

Figure 18:
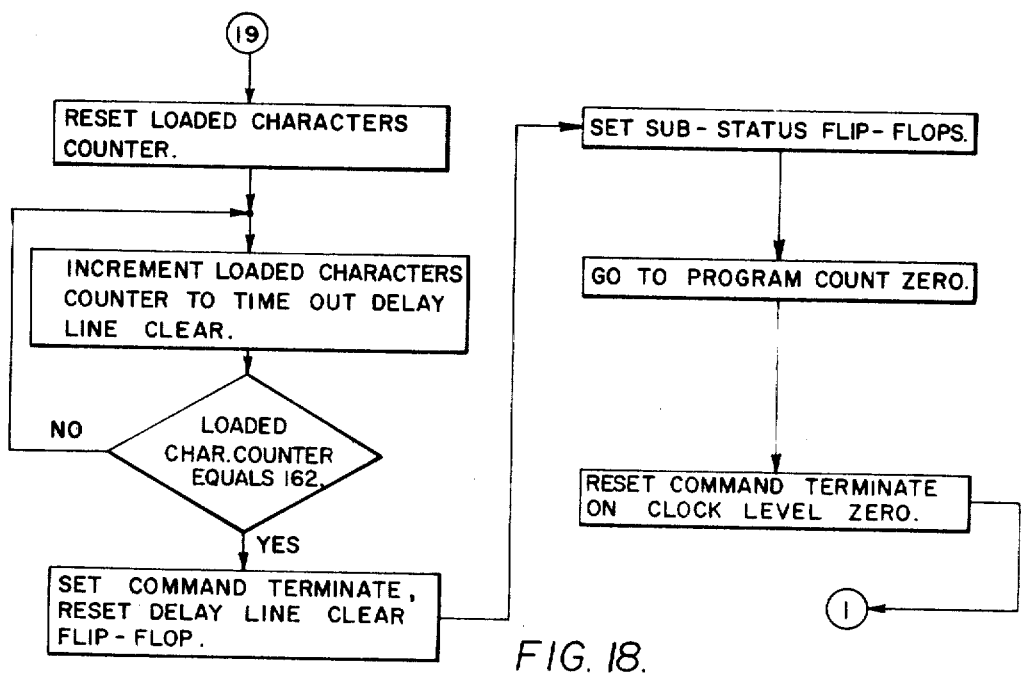

FIGURE 18 is a flow diagram illustrating the operation of the system of the present invention during program count 7.

Figure 19:
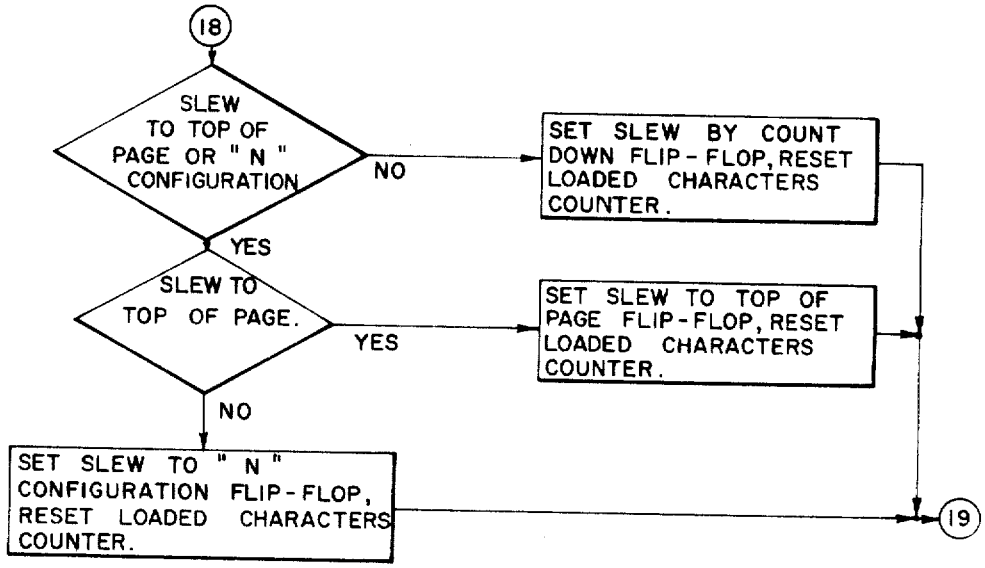
Figure 20:
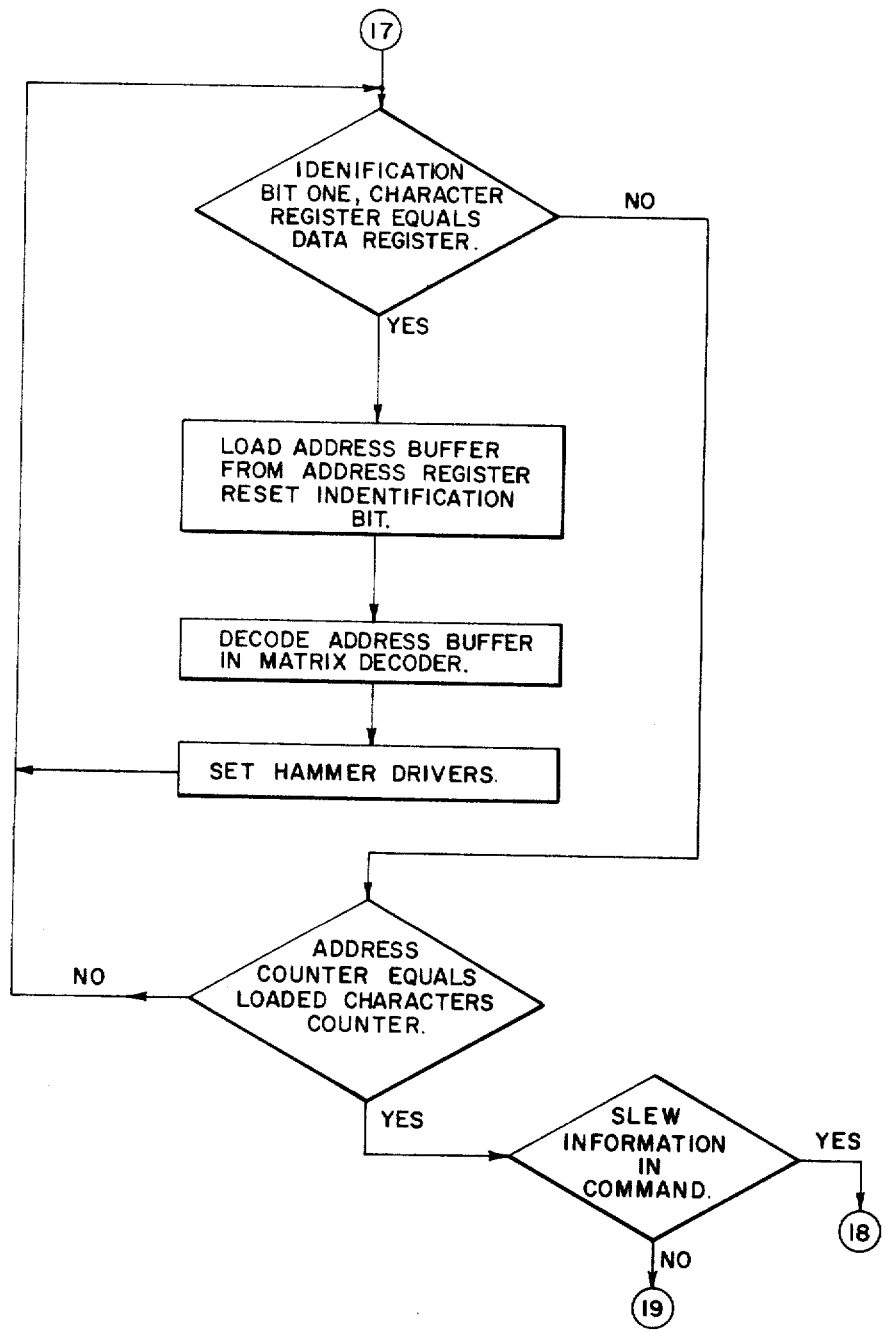

FIGURES 19 and 20 are flow diagrams useful for illustrating the operation of the system of the present invention during the end of print cycle.

The present invention will be described in terms of block diagrams and flow charts. It should be understood that the logic circuits involved are not important to the practice of the invention and may be selected from a great variety of such circuits readily available in the art and readily arranged by those skilled in the art. Simple decoding networks, registers, logic circuits for providing the usual logic functions, and counters have been discussed at great lengths in vast numbers of publications and need not be discussed here.

The terms used in the description of the present invention will also include reference to specific codes and timing relationships; it will be obvious to those skilled in the art that the selection of an appropriate code will depend on many factors not particularly related to the concept of the present invention. Such considerations as the nature of the external user system and the type of information to be encountered will frequently dictate both the codes to be used and the timing relationship among the various components.

Figure 1:
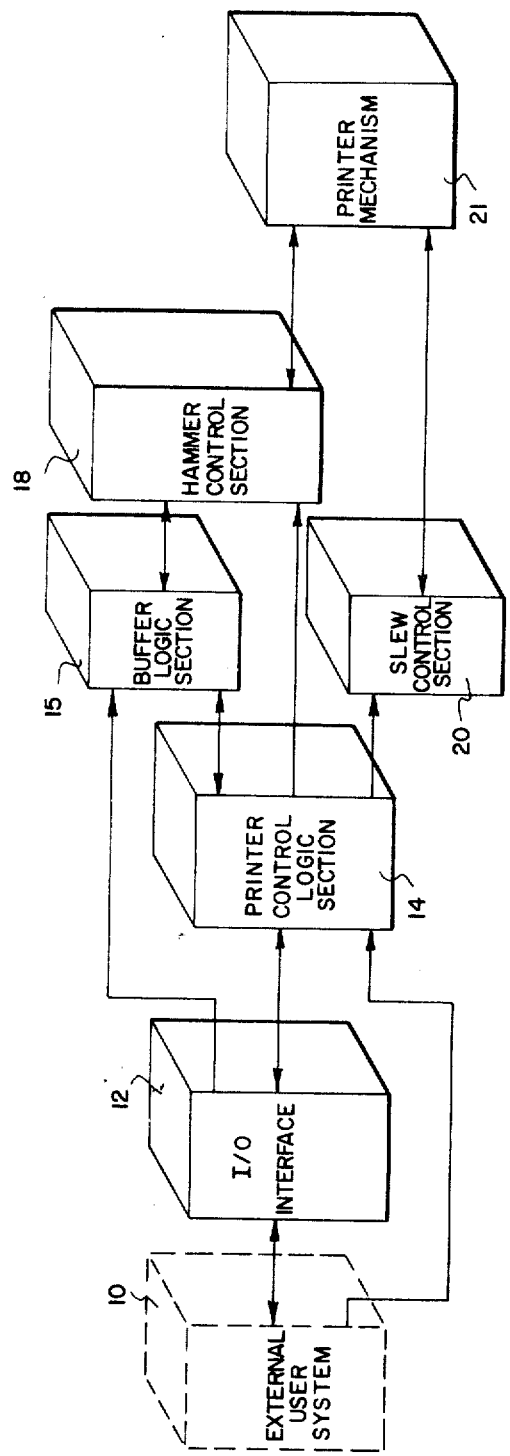
FIGURE 1 is a schematic block diagram showing the major sections of the printer system.

Referring to FIGURE 1, the printer system of the present invention is shown in simplified block diagram. The diagram shown in FIGURE 1 is intended as an introduction to the various functional portions of the system; each functional block in FIGURE 1 will be discussed in greater detail in reference to other figures. As external user system shown in FIGURE 1 at 10 may be a data processing system connected to the printer system of the present invention for providing the necessary information to be printed while the printer system is operating "on line." Alternatively, the external user system 10 could be an intermediate storage system such as a tape unit having information to be printed stored therein along with the necessary printer control commands for operating the printer system "off line." The external user system 10 is connected to the printer system of the present invention through an input/output interface 12 which acts as a receiver for command and print information. This interface also provides the necessary connections to the external user system to provide information to the external system indicating the status of the printer system at any given time. The interface 12 also provides a means for sending to the external user system and receiving from the external user system signals representing a request for information or indicating that information is available to be sent to the printer system.

The input/output interface 12 shown in FIGURE 1 is connected to a printer logic section 14. The printer control receives the commands and data from the input/output interface 12 and performs several functions upon these received commands and data such as checking input data for errors, providing necessary clocking pulses, decoding commands, and several other functions as will be described more fully hereinafter.

The printer control logic section 14 is connected, in FIGURE 1, to a functional block provided to indicate the buffer logic section 15. The buffer logic section 15 provides for the necessary accumulation of the data received from the external user system 10 to enable all of the characters in a given line of print to be received, stored, and sent to the printer mechanism to be printed. The buffer logic section 15 of FIGURE 1 is connected to a hammer control section 18 to indicate that the accumulated data is provided to a hammer control system that decodes the information as it is received from the buffer logic section into the necessary information for application of signals to hammer drivers, thus causing print hammers to strike the printer paper. The printer control logic section 14 is also connected directly to the hammer control section 18 of FIGURE 1 to provide the necessary control functions within the hammer control section.

To enable the paper in the printer to be slewed at the proper time, appropriate signals are provided to a slew control section 20 by the printer control section 14; slew control information is received from the printer control section and is stored in the slew control section until the appropriate time for slewing the paper is reached. The slew control and the hammer control are each directly connected to a printer mechanism 21 for controlling the printing of characters on the printer paper and moving or slewing the paper for the next line of characters to be received.

Thus, command information and information pertaining to characters to be printed are received from an external user system by the printer system input/output interface. The signals are transmitted by the interface to the printer control section which decodes the necessary command information and provides the commands to the remainder of the printer system. The information to be printed is transmitted through the printer control to the buffer logic section and stored there until the appropriate time indicated by the command signals for transferring the stored data to the hammer control section. Upon receipt of the proper control signals from the printer control, and the necessary synchronizing signals from the printer mechanism, the hammer control section will cause the characters to be printed on the print paper. Upon completion of printing the characters, the slew control will, in accordance with commands received from the printer control and synchronizing signals received from the printer mechanism, slew the paper to the next position for printing the succeeding line of characters.

Figure 2:
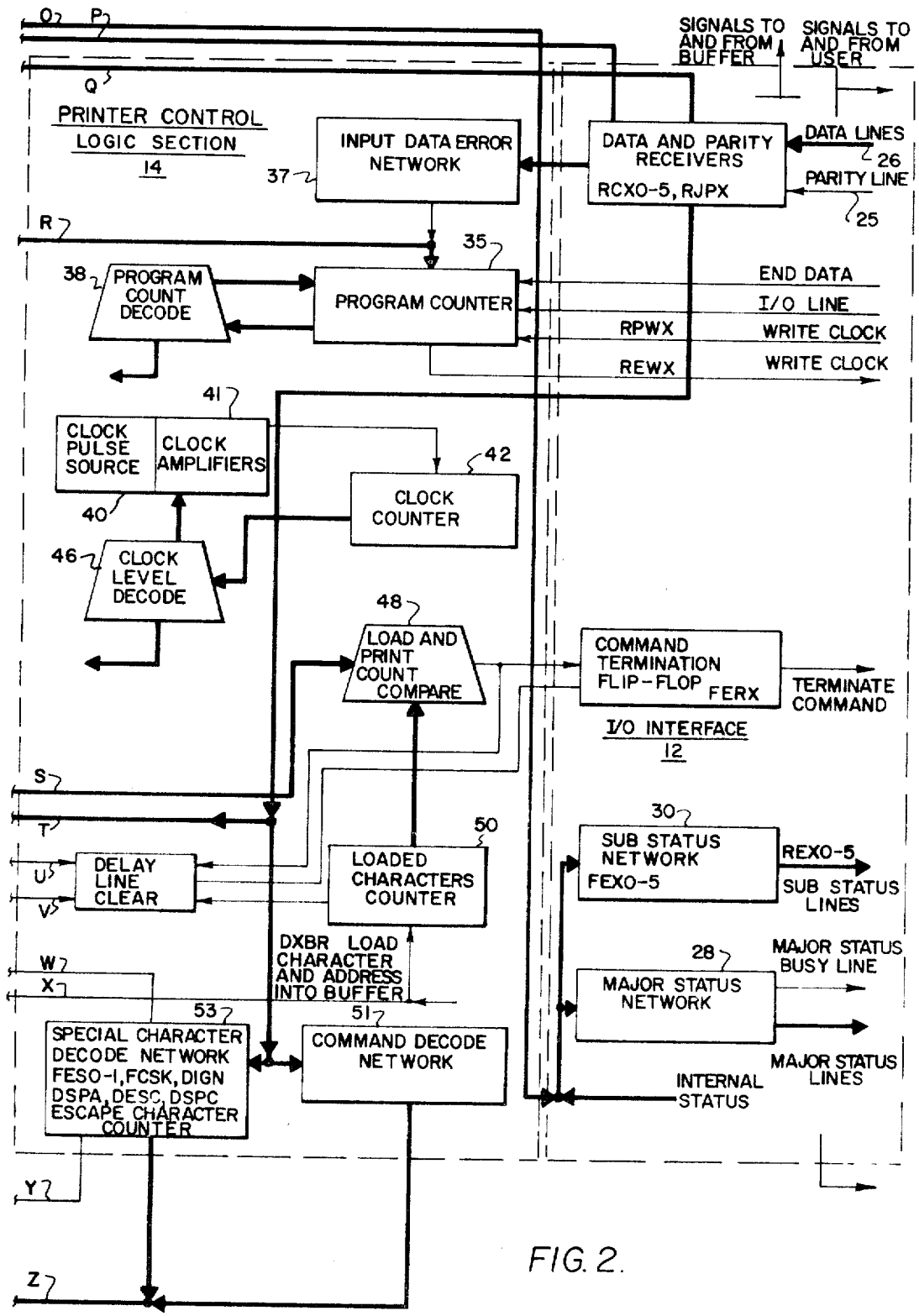
FIGURE 2 is a schematic block diagram showing the input/output interface and the printer control logic section of FIGURE 1 in greater detail.
Figure 3:
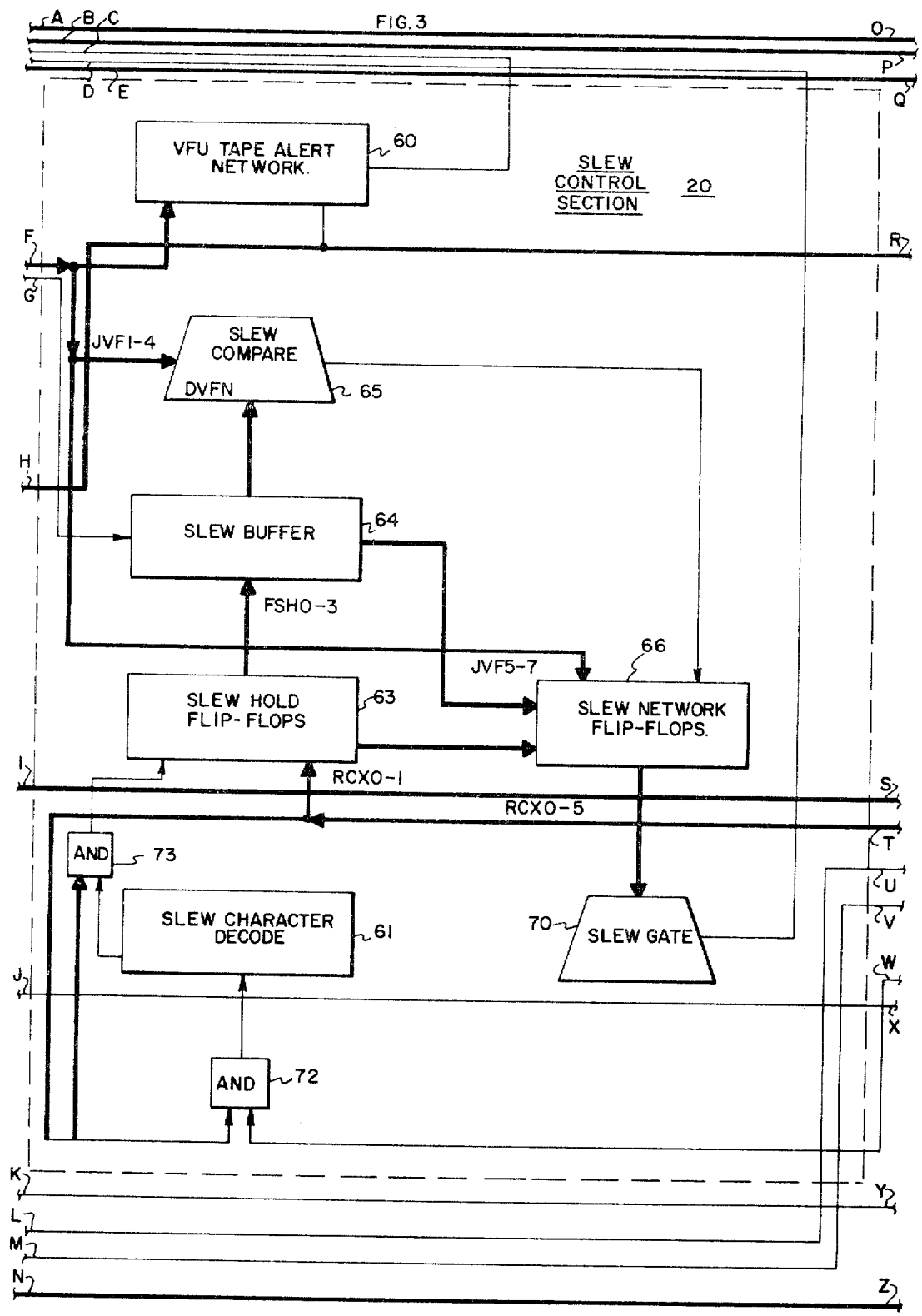
FIGURE 3 is a schematic block diagram showing the slew control section of FIGURE 1 in greater detail.
Figure 4:
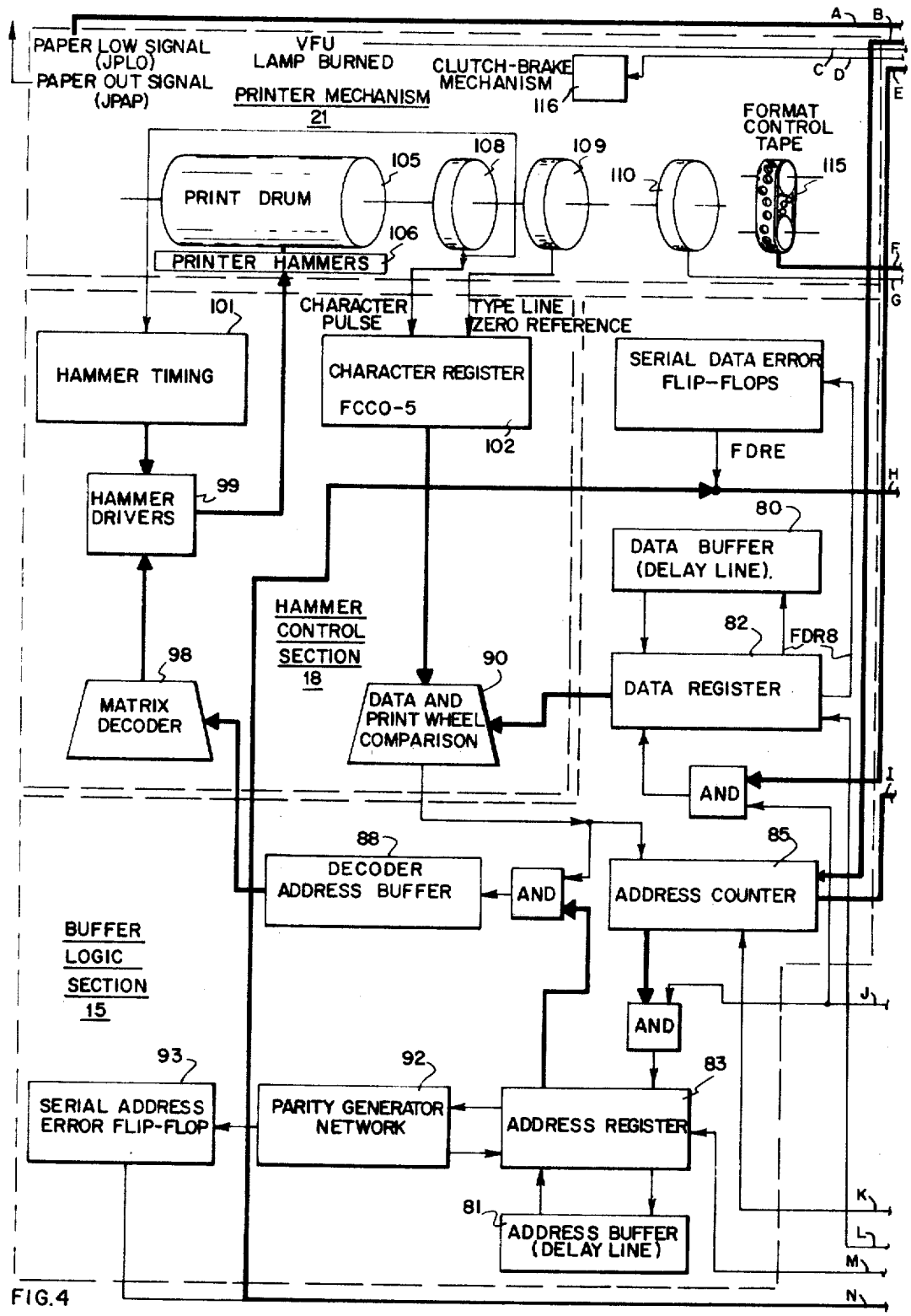
FIGURE 4 is a schematic block diagram showing the buffer logic section, the slew control section, and the printer mechanism of FIGURE 1 in greater detail.

The block diagram of FIGURE 1 will now be discussed in greater detail by reference to FIGURES 2, 3, and 4. The functional blocks shown in FIGURES 2, 3, and 4 represent actual logic circuits which may be any of a variety of well-known circuits arranged to perform the necessary functions. In view of the state of the art, it is felt unnecessary to describe such details as circuitry in order to teach one skilled in the art to practice the present invention.

The lines representing the interconnection of blocks in FIGURES 2–4 are weighted to indicate whether several conductors are used (to transfer signals in parallel) or relatively few or a single conductor is used (to transfer control signals, etc.).

Referring to FIGURE 2, the input/output (I/O) interface is shown in schematic block form. The input/output interface provides the necessary connection between the printer system and the external user system. The interface is connected to the external user system by a plurality of electrical conductors as described below.

Data and parity receivers are connected to the external user system through a parity line 25 and a plurality of data lines 26. In the particular embodiment chosen for illustration, six data lines are used. The data and parity receivers of FIGURE 2 are indicated as receivers RCX0–5 and RJPX respectively. A command termination flip-flop FERX is also provided in the input/output interface to provide a signal to the user system that a command previously provided to the printer system had been obeyed and the printer system is ready for another input routine. A major status network 28 provides a plurality of status codes to the external user system indicating the present status of the printer system to enable the user system to act accordingly. The codes provided by the major status network are as follows:

(a) 0000 Channel Printer System Ready
(b) 0010 Attention Condition
(c) 0011 Data Alert
(d) 0101 Command Reject
(e) 1000 Channel Printer System Busy The Channel Printer System Ready status indicates that the printer system is in a state ready to accept a print or slew command from the external user system. An Attention Condition indicates that a condition exists within the printer system that requires manual intervention before the system can accept a print or slew command. An Attention Condition is accompanied by additional information sent from the input/output interface to the external user system through the substatus network to be described later. The Data Alert status indicates that a resettable error condition occurred within the printer system during the execution of the previous command. As in the case of the Attention Condition, additional information will be provided to the external user system by the substatus network to be described later. A Command Reject status indicates that the printer system is rejecting the command currently being transferred. At the time this status condition is provided from the major status network, the substatus network will provide additional information to enable the external user system to determine several other points of information regarding the Command Reject. A Channel Printer System Busy signal from the major status network indicates to the external user system that the system is in the process of executing a command.

As mentioned previously, the input/output interface also includes a substatus network 30 having a plurality of flip-flops FEX0–5. These flip-flops are set and rest to provide an appropriate code to indicate substatus information to the external user system. For example, when an Attention Condition is provided by the major status network 28, the substatus network 30 may indicate that the Attention Condition is caused by any of the following:

(a) Out of Paper.—This condition will normally be detected during a paper slew operation and any commands received while this substatus condition is true will be rejected by the printer system and the "Out of Paper" attention status will be set in response.
(b) Manual Halt.
(c) Vertical Format Unit (VFU) Tape Alert.—This condition indicates that difficulty is being experienced with the Vertical Format Unit Tape (to be described later) and that external intervention is necessary to prevent slew errors.

When the major status network is providing a Data Alert code to the external user system, the substatus network may indicate any of the following substatus conditions:

(a) Transfer Timing Error.—This error code indicates that the external user system has failed to respond to a request for a print line data character within the designated maximum allowed time between received characters.

(b) Error Detected Before Printing.—These errors include parity error on a print line character received from the external user system, a transfer timing error as defined in paragraph (a), buffer overflow (more than the maximum number of characters and/or spaces are received from the external user system), or an internal parity error indicating that a parity error is detected before printing on a character circulating within one of the system's internal delay line buffers.

(c) Error Detected After Printing Commences.—This code indicates that a parity error has been detected in one of the internal delay line buffers after the initiation of a printing cycle.

(d) Paper Low.—This code indicates that the paper supply within the printer system is low and requires manual intervention.

(e) Slew Error.

(f) Top-of-Page Echo.—This error occurs if paper is slewed to the top of a page and stops there by any command other than a slew to top of page command.

If either the substatus defined in paragraph (e) or (f) is detected while the printer system is in the Channel/Printer System Busy state, the execution of a command is immediately terminated, the specific "Data Alert" status is placed upon the appropriate status lines, and the "Terminate" signal is set. If either of the substatus commands in paragraphs (e) or (f) above is detected subsequent to a command termination and prior to receipt of another command, the printer system will revert to the specific Data Alert status mode but no "Terminate" signal will be set to the external user system. The next command received will be one of the following.

(1) Request Status Command.—Printer System returns the appropriate status.

(2) Reset Status Command.—Printer system resets all resettable status and returns either the Channel/Printer System Ready status or any existing "Attention" status.

(3) Print or Slew Command.—Command is rejected with the Command Reject status return. Subsequent print or slew commands will be treated normally.

When the major status network provides a code indicating a Command Reject, the substatus network will provide a code representing one of the following:

(a) Invalid Operating Code.—This code indicates either parity error on the operation code or an illegal operation code.

(b) Slew Error on Last Slew Operation.—Indicates a slew error was detected during the previous slew.

When the major status network provides a code indicating Channel/Printer System Busy to the external user system, no additional information is necessary from the substatus network. The signals developed by the major status network and the substatus network are developed through the utilization of internal status signals provided to each of the networks from the various affected portions of the printer system.

The printer control logic section of FIGURE 1 is shown in greater detail in FIGURE 2. It will be noted that in FIGURE 2 the printer control portion of the present printer system receives control data and information from the input/output interface; however, certain signals are provided directly to the printer control logic section from the external user system without first being transmitted through the interface. These control signals are an I/O line for receiving a signal from the external user system indicating that an input/output sequence is desired by the user system. An output write clock line REWX is also directly connected to the printer control logic; this line is used as a means for requesting command information and print line data characters from the external user system. An end data transfer line is also provided directly to the printer control logic; this line is used to transmit a signal indicating that the transfer of print line data to the printer system is complete. Upon receipt of this signal, the printer system will stop requesting data characters and will cause the printing cycle to be initiated. The printer control logic section also provides an input write clock RPWX used to clock command information and print line data into the printer system.

The connections directly to the external user system from the printer control logic section are provided through a program counter 35. This program counter defines and controls the operating status of the entire printer system. An input data error network 37 is connected to the data and parity receivers of the input/output interface to receive information therefrom and check each command and print line character code for parity error.

A program count decode 38 is connected to the program counter to enable the respective counts of the program counter to be interpreted for application to the remainder of the system. Appropriate amplification and fan-out of the program counter count is thus provided throughout the system.

A clock pulse source 40 is utilized to general clock signals at a predetermined frequency, these signals being amplified by clock amplifiers 41 and applied to a clock counter 42. The clock counter 42 receives the basic clock frequency and reduces the frequency through the utilization of a series of flip-flops to provide nine separate clock times for use throughout the printer system. A clock level decode 46 is connected to the clock counter to decode the various clock times provided by the clock counter and to utilize those clock times desired for the various circuits throughout the system.

A load and print count compare decoder 48 receives information from an address counter 85 (FIG. 4) of the buffer logic section and from a loaded characters counter 50, both to be described, to provide a signal to the command termination flip-flop of the input/output interface. The loaded characters counter 50, mentioned previously, includes flip-flops for counting characters loaded into the registers of the data and address buffer delay lines.

The printer control logic section of the printer system includes a command decode network 51 for receiving commands from the data and parity receivers of the input/output interface. The command decode network interprets the commands provided to the printer system from the external user system and provides the necessary signals to the remainder of the printer system to enable the appropriate commands to be executed. The information from the data and parity receivers of the input/output interface is also supplied in parallel to a special character decode network 53 which recognizes special characters not otherwise recognizable by the command decode network. The special character decode network will be described in greater detail, and particularly its function, at a more appropriate time.

FIGURE 3 represents a more detailed block diagram of the slew control section of the printer system of the present invention. The slew control section receives information and command data from the printer control logic section and receives necessary control signals from the printer mechanism. A vertical format unit (VFU) tape alert network 60 is provided to receive a signal from the printer mechanism (to be described) indicating that the vertical format unit lamp has burned out and also is connected to format control tape output lines F for detecting other vertical format tape alert conditions such as, non-allowed code, broken tape, etc. A slew character decode 61 is provided for receiving information from the data and parity receivers of the input/output interface. The slew character decode 61 receives the information from the external user system through the printer control logic section. The output of the slew character decode is provided to slew hold flip-flops 63 for storing the necessary slewing information prior to execution of the slew maneuver. The slew hold flip-flops dump information contained therein to a slew buffer 64 which co-operates with a slew compare 65, as described more fully hereinafter, to appropriately set, in combination with the slew hold flip-flops, the slew network flip-flops 66. The latter are connected to a slew gate 70 which directly operates the clutch-brake mechanism of the printer. Thus, information is received by the Slew Control section from data and parity receivers of the input/output interface together with the necessary control information from the printer control logic section. The slew character or slew commands are decoded and logically operated upon to store the necessary information concerning the type and amount of slew to take place after the completion of the printing. Upon an appropriate signal from the printer mechanism indicating that the necessary previous print line had been completed, the slew gate of the slew control logic operates the clutch-brake mechanism of the printer to advance the paper. A logic control gate 72, providing the logical conjunctive function, receiver signals from data received RCX5 and from the special character decode network 53. A logic control gate 73 receives signals from data receivers RCX0 through RCX4 and from the Slew Character Decode network 61.

Referring to FIGURE 4, two buffer delay lines 80 and 81 are provided within the buffer logic section 15, the first of which receives and stores print characters, and the other of which stores the address of the respective print characters. The two delay lines form circulating storage devices, each having a register, 82 and 83 respectively, in series therewith. The data and address buffer delay lines and their corresponding registers will be discussed in greater detail hereinafter. An address counter 85 is provided in the buffer logic section 18 for receiving signals from the hammer control section indicating the character on the print drum presently being detected by the hammer control section. A decoder address buffer 88 is connected to the address register 83 for storing an address on the print drum detected as being the address of a character to be printed. The output of the address buffer is applied to the hammer control section. The data register 82 provides signals to a comparison decode 90 of the hammer control section 18. The address register 83 is connected to a parity generator network 92 which generates and checks parity of the address; an error in a checked address results in an error signal from the parity generator network to a serial address error flip-flop 93 of the buffer logic section.

The hammer control section 18 shown in FIGURE 4 receives addresses, each of which represents a character for which one of the print hammers in a line of print hammers is to be energized. The hammer control section includes a matrix decoder 98 for receiving information from the buffer logic section relevent to the address of a character to be printed. The matrix decoder 98 receives the address information and provides the necessary output pulses to hammer drivers 99 for energizing the necessary hammers, thus causing the corresponding hammers to strike the printer paper against the print drum to impart a printed character to the paper. The hammer divers 99 are synchronized by a hammer timing circuit 101 receiving its timing pulses directly from the printer mechanism 21. A character register 102 is utilized to receive signals from the printer mechanism indicating the characters presently coming into the print position. The character register receives the coded character signal in the form of character pulses delivered from the printer mechanism. The character register is resetable upon receipt of a type line zero reference signal, from the printer mechanism, indicating that the print drum has completed a revolution and that the sequence of characters coming into print position is being repeated.

The printer mechanism 21 shown in FIGURE 4 includes a print drum 105 of the type having several columns of characters (in the embodiment chosen for illustration, 136 columns are used) each column consisting of sixty-four characters spaced circumferentially about the drum in that particular column. Thus, the print drum would include a row of 136 A's, 136 B's, etc. . . . The print drum is rotated about its axis so that at any particular point opposite a column of characters on the surface of the drum, all the letters of the alphabet and all other characters are presented to the point once for each revolution of the drum. Print hammers 106 are positioned in a line along the print drum opposite a respective one of the columns; thus, each hammer is presented with all of the characters in one of the columns as the drum rotates. A ribbon and paper (not shown) are interposed between the print drum and the print hammers; thus, a line of print may be placed upon the paper by energizing the respective hammers as the drum rotates, the hammers striking the ribbon and paper when the appropriate character registers with the print hammer.

The printer mechanism also includes a character disk 108 comprising a disk having a plurality of holes arranged in a coded formation to provide coded signals through the utilization of photoelectric sensing equipment. The coded arrangement of holes in the character disk registers with the characters on the print drum so that when a particular character is coming into printing position, the corresponding code for that character will be detected by photoelectric equipment associated with the character disk. The print drum also includes a type line zero reference disk 109 that may be incorporated into the character disk or may comprise a separate disk appropriately coded to provide a zero reference signal upon the completion of a print drum rotation.

The printer mechanism 21 also includes a line marker drum 110 that is connected to and rotates with the paper drive mechanism for advancing the paper between print lines. The line marker drum includes conventional signal generating means for providing pulses to the slew buffer 64 of the slew control section 20 (FIG. 3) to indicate to each line that the paper is being advanced. A format control tape 115 is also mounted upon and rotates with the paper driving mechanism. The format control tape may be a punched tape having coded perforations therein as will be described more fully hereinafter. A paper advancing motor (not shown) drives the paper advancing mechanism through the expediency of a clutch-brake mechanism 116 energized by the slew gate 70 of the slew control section. The printer mechanism may also contain other control information of a relatively common nature such as signals to indicate that light sources for photoelectric reading devices have burned out, paper low or paper out signals, etc.

The code utilized on the endless paper vertical format tape 115 may assist in the advancing of the paper in accordance with predetermined command codes. For example, one common slew command indicates that the paper will be slewed to the top of the next page upon completion of the preceding page; accordingly, a specific punch in a specific column on the vertical format tape may be used to indicate the "top of page." Also, certain types of automatic slew operations may be performed by utilizing specific code configurations of the punches on the paper tape. The following indicates the respective channels on the paper tape and the interpretation of holes in the various channels:

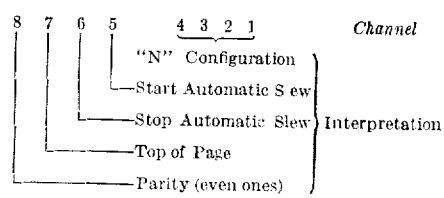

The format tape contains eight usable channels which are interpreted logically for various slew-position and parity indications. Channels 1-4 may be punched in any one of fifteen possible configurations. When an N punched configuration is specified in a command received from the external user system, paper is slewed until the specified punched configuration is matched by the tape. A punch in channel 5 is interpreted as the start of automatic paper slewing which then moves the paper until a punch is detected in channel 6. A punch in channel 7 is the most frequently used channel punch and indicates that the slewing is to be a top of page slew to advance the paper so that printing may begin at the top of the next page. Channel 8 is used as a parity channel.

The signals received by the printer system from the external user system through the data lines represents both information to be printed as well as command information. The codes used in the transmission of the character and command information may vary considerably; however, a significant increase in the efficiency with which the printer system can operate is achieved through the utilization of a unique command sequence. To more completely understand the significance of the above-mentioned command sequence, a brief description will be given of the various commands and command codes utilized by the printer system chosen for illustration. The character information and command codes are supplied to the printer system in the form of six-bit character codes and a parity bit received over the data lines 26 and parity line 25. The information thus supplied to the printer system is received by the data and parity receivers RCX0-5, and RJPX (FIGURE 2).

The command information includes slew commands, print commands, a command for requesting the printer system status, and a reset command. The command codes are as follows:

|  | $2^5$ | $2^4$ | $2^3$ | $2^2$ | $2^1$ | $2^0$ |
|---|---|---|---|---|---|---|
| Slew Commands: |  |  |  |  |  |  |
| No slew information provided in command | X | X | X | X | 0 | 0 |
| Slew single line | X | X | X | X | 0 | 1 |
| Slew two lines | X | X | X | X | 1 | 0 |
| Slew to top of page | X | X | X | X | 1 | 1 |
| Print Commands: |  |  |  |  |  |  |
| Print one line in Edit mode | 0 | 1 | 1 | 0 | X | X |
| Print one line in Non-Edit mode | 0 | 0 | 1 | 0 | X | X |
| No print | 1 | 1 | 0 | 0 | X | X |
| Other Commands: |  |  |  |  |  |  |
| Request Printer System Status | 0 | 0 | 0 | 0 | 0 | 0 |
| Reset Printer System Status | 1 | 0 | 0 | 0 | 0 | 0 |

Both the print and slew information may be combined into one command code: for example, a single command may be used to print one line in the edit mode and slew the paper two lines. Such a command would be encoded as 011010. When the command contains both print and slew information, the printing operation is executed first followed immediately by the execution of the slew operation.

There are two modes of printing: edit mode and non-edit mode. In the edit mode of operation, there are several characters which, when sent to the printer system as a part of the print line data have unique meanings and are treated as described below:

Escape character (111111)

This character, when received by the Printer System as part of the print-line data, indicates that special consideration is to be given the character following the Escape character, as described below:

(a) *Escape character followed by 0XXXXX character.*—
When the character following one Escape character has a zero in the $2^5$ bit position, it is treated as a Slew character as described below. Both the Escape and the Slew character are deleted from the print line.

(b) *Escape character followed by 10XXXX character.*—
When the character following one Escape character has a one in the $2^5$ bit position and a zero in the $2^4$ bit position, it is treated as a Skip character, as described below. Both the Escape and the Skip character are deleted from the print line.

(c) *Escape character followed by 11XXXX character.*—
When the character following one Escape character has ones in both the $2^5$ and $2^4$ bit positions, but is not another Escape character, both the Escape character and the following character are deleted from the print line. If the character following one Escape character is another Escape character, both are deleted from the print line and the subsequent character is printed.

Ignore character (001111)

If two successive Escape characters are followed by an Ignore character, the Escape characters are deleted and the Ignore character is printed as a "?". If an Ignore character not immediately preceded by two successive Escape characters is received as part of the print-line data, it is deleted and the remaining print-line characters are left-justified.

Space character (010000)

If a Space character not immediately preceded by an Escape character is received as part of the print-line data, a one-character blank space is caused to appear in the print line. A Space character preceded by a single Escape character is interpreted as a Slew character. If two successive Escape characters are followed by a Space character, the Escape characters are deleted and the Space character is printed as a ƀ (slashed b).

Slew character (Escape followed by 0XXXXX)

The Printer system interprets a Slew character as follows:

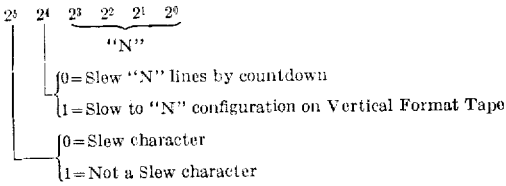

(a) If, in a Slew character, the $2^4$ bit is a zero, paper is slewed the number of lines indicated Modulo 2 by the four least-significant bits ($2^3$ through $2^0$).

(b) If the $2^4$ bit is a one, paper is slewed until the configuration of the four least-significant bits is encountered on the Vertical Format Tape, unless the four least-significant bits are zeros.

(c) If the $2^4$ bit is a one and the four least-significant bits are zeroes, paper is slewed to the top of the page. In each of the above cases, slewing is executed after printing has been accomplished.

The Printer system interprets the receipt of a Slew character as an indication of the completion of the print-line data transfer.

*Skip character* (Escape followed by 10XXXX).—Upon receipt of a Skip character, the Printer System causes an insertion into the print line of as many spaces as indicated by the low-order four bits of the Skip character, that are weighted as follows:

$2^0$ bit = 8 spaces
$2^1$ bit = 16 spaces
$2^2$ bit = 32 spaces
$2^3$ bit = 64 spaces Any configuration of these four bits may be set. Thus, as many as 120 spaces may be inserted in the print line by means of the Skip character.

A "no-print command," interpreted as a "slew only" command, causes the printer system to slew paper as specified by the configuration of the two low-order bits of the command character. The "request printer system status" causes the printer system to transfer to the external user system all existing status conditions provided by the major status network and the substatus network of the input/output interface. A "reset printer system status" causes the printer system to reset all resetable status not requiring manual intervention.

The non-edit mode may have many uses such as for diagnostic routines and generally requires that the external user system exercise more complete control over the printer system. The Escape and Ignore characters have no special connotation in this mode of printing and are always printed. The Escape character is printed as a Λ (caret), and the Ignore character as a Ɨ (slashed letter I). The space character causes a blank space to appear in the line of print. Because in this mode, a slew character cannot be recognized by the printer system, the external user system must always indicate that the transfer of print line data has been completed by generating the "end of data transfer" signal provided to the program counter of the input/output interface by the external user system.

Prior art printing systems have generally utilized a bulky and expensive buffering system to enable the incoming information to be stored in the proper relationship to subsequently be printed. Some prior art printing systems have suggested the utilization of delay lines as a character storage means; however, the readout from these delay lines necesitates the synchronous loading of the incoming information into the delay line. Thus, a character to be stored in the delay line, if not received immediately after the preceding character, must be held in a register until the proper location for that character is presented by the delay line. The buffering of the present printer system completely eliminates the need for a large expensive buffer without imposing the disadvantages of a delay line requiring synchronous loading. The buffering system of the present invention contemplates the utilization of two delay lines, one for storing characters to be printed and the other for storing the addresses of the respective characters. The delay lines are synchronized so that the character appearing in the delay line register occurs in the register simultaneously with the occurence of the adress for that character in an address register. The utilization of the synchronized delay lines greatly reduces the cost of buffering printer information while nevertheless permitting asynchronous loading of the print characters and permitting considerably greater speeds of both loading and unloading. To more clearly illustrate the concept of buffering employed in the printer system of the presnt invention, portions of FIGURES 2, 3, and 4 are reproduced in somewhat greater detail in FIGURE 5.

Figure 5:
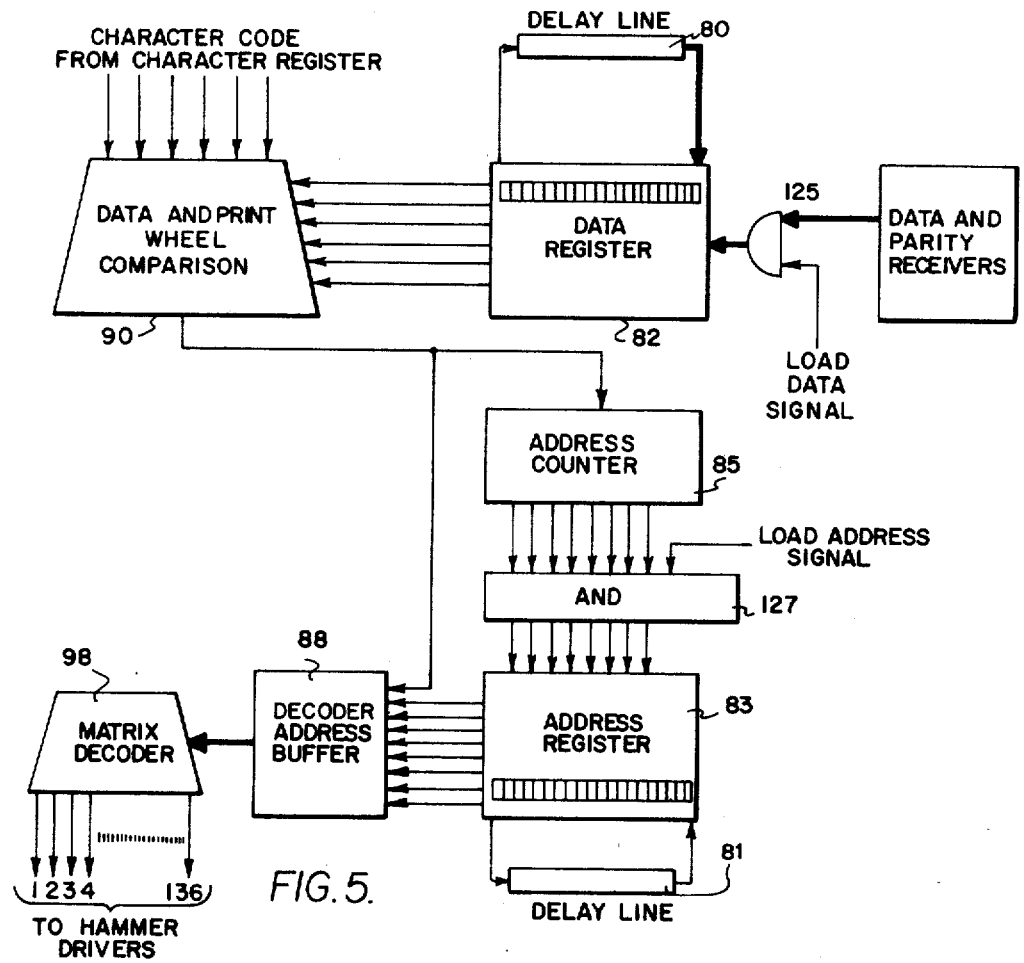
FIGURE 5 is a schematic block diagram of portions of FIGURES 2, 3, and 4 shown in greater detail useful for describing the operation of the synchronized delay lines of the present embodiment.

Referring to FIGURE 5, the data and parity receivers of the input/output interface are shown connected to the data register 82 through a logic gate 125. The six bit code for a print character, and the accompanying parity bit, received by the data and parity receiver are applied through the gate 125 to the data register upon receipt of a load data signal. The data buffer delay line 80 may take a variety of forms and includes a means for recirculating the information placed on the line. The time length of the delay line may be divided into time slots which, in the embodiment chosen for illustration, are nine bits long, each it lasting 500 nanoseconds. A nine-bit register in the recirculating path of each delay line allows parallel loading and unloading of data and address information. The information received from the data and parity receivers (six bit character code and parity bit) is applied to the data register and awaits an open time slot. The time slots are each designated by an identification bit and, when a time slot is occupied, the identification bit is "set." Thus, when a character has been applied to the data register from the data and parity receivers, a check of time slots is made; when an empty time slot (i.e., a time slot without a "true" identification bit) is encountered, a load data signal is generated and the character is transfered into the data register together with a timing bit. Thus, a nine bit code recirculates in the delay line for each print character; the recirculating code for each character includes the six bit character code, a parity bit, a timing bit, and an identification bit.

Simultaneously with the detection of an empty time slot in the data buffer delay line 80, and with the generation of a load data signal to thereby dump the contents of the data and parity receivers into the data register 82, a load address signal is generated to be used as described below. An address counter 85 which, after the completion of a print cycle is always reset to "one," applies an eight bit address code through a logical gate 127 to an address register 83. The address counter 85 is gated through the conjunctive gate 127 by before-mentioned load address signal. The operation of the address register 83 is identical to that of the data register 82 with the exception that no identification or timing bit is used; rather, the eight bit address code is dumped into the register while a parity bit is generated serially. The eight bit address will recirculate in the data buffer delay line 81 and, since delay lines 80 and 81 are synchronized, the address code will always occur in the address register when the corresponding data appears in the data register. After the insertion of the address in the address register 83, the address counter 85 is incremented by one. Thus, as each character is received from the external user system, it is loaded into the data delay line simultaneously with the loading of the corresponding address into the address delay line. When a character is received from the external user system to be loaded into the delay line buffer, it is not necessary for the character to wait until any particular time slot is provided in the recirculating path of the delay line 126. Thus, the characters may be loaded asynchronously and any empty time slot (indicated by a "false" identification bit) may be used to store the character. The characters are thus recirculating in the data buffer delay line 80 in a random order while the corresponding addresses for the characters are synchronously recirculating in the address buffer delay line 81 in a like random order.

After the characters from the external user system have all been loaded in the data buffer delay line 80, and the corresponding addresses have been loaded into the address buffer delay line 81, the printer system will then appropriately cause the print sequence in the following manner. The present invention contemplates the significant difference in the rapidity with which the characters on the print drum come into position for printing and the rapidity with which a character wil recirculate in the data buffer delay line. Thus, a character code from the character register 102 of the hammer control section 18 is applied to the data and print wheel comparison circuit 90. The six bit character, sensed as presently coming into print position, is maintained in the comparison circuit 90 while all of the characters in the data buffer delay line 80 are circulated through the data register 82 and are compared with the character code from the character register. When a positive comparison is made, a gating signal is applied to the decoder address buffer 88 which receives corresponding addresses from the address register 83. Thus, when a positive comparison is made between a character in the data register 82 and a character on the print drum approaching the print position, the decoder address buffer 88 will gate an eight bit code from the address register 83 to the matrix decoder 98 of the hammer control section. The matrix decoder 98 decodes the eight bit code from the address buffer and applies an appropriate signal to one of 136 hammer drivers. When the character on the print drum comes into printing position, a timing signal is received from the printer mechanism that fires the hammer drivers and causes the appropriate hammers to strike the drum and print the character.

To further explain this particular feature of the present invention, it will be assumed that the character C is to be printed in the first, third and fourth columns. The external user system will then send the code for the character C as the first character to be inserted in the data buffer delay line, as the third character to be inserted in the data buffer delay line, etc., . . . Each time the character C is received from the external user system, and an empty time slot is found in the data buffer delay line 80, the character code for C together with the identification bit, timing bit, and parity bit will be loaded into the data register 82 while the address contained in the address counter 85 will be loaded into the address register 83. Since the character C was received as the first, third, and fourth characters from the external user system, the addresses loaded into the address register by the address counter will be one, three, and four. When all of the characters to be printed have been received from the external user system, and the printer system is to print the characters as indicated, character codes from the character register 102, will be applied to the data and print wheel comparison circuit 90. When the row of C characters on the print drum are approaching the print hammer positions, the character C is applied to the comparison circuit 90. While this character code exists in the comparison unit 90, the characters in the data buffer delay line 80 are recirculated through the data register 82 and each are compared with the C in the comparison circuit. The character C will occur in the delay line 80 on three different occasions; the first occasion will occur when the address in the address register is "one," the second occurrence will correspond with an address of "three" in the address register, the last occurrence will correspond to an address of "four" in the address register 83. In each of these instances of correspondence, or positive comparison, the address buffer will be gated by the positive comparison so that the addresses "one," "three," and "four," will be sent through the address buffer to the matrix decoder to set hammer drivers one, three, and four. Subsequently, when a timing signal is received from the printer mechanism, hammers one, three and four will be fired and will strike the drum as the row of C characters come into registration with the print hammers. Since only hammer drivers one, three, and four have been set, the character C will be printed only in columns one, three and four.

As mentioned previously, numerous types of delay lines may be used; however, it has been found that a reliable and inexpensive delay line system may readily be designed utilizing well-known magnetostrictive or sonic delay lines. It has been found that a pair of such delay lines may readily be synchronized to the extent necessary to insure that the address recirculating in the address delay line is present in the address register when the corresponding character, recirculating in the data delay line, is present in the data register.

Figure 6:
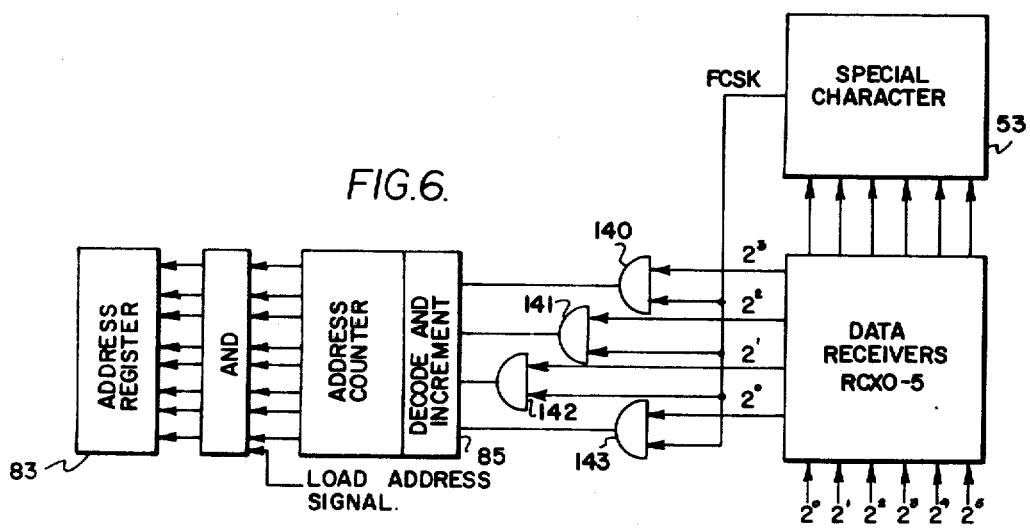
FIGURE 6 is a schematic block diagram of portions of FIGURES 2, 3, and 4 shown in greater detail useful for describing the skip count sequence of the present embodiment.

Another significant advance presented by the printer system of the present invention is the concept of the recognition of special characters to enable multiple "spaces" to be entered in the print line. To more fully describe the advance represented by this concept, portions of FIGURES 2, 3, and 4 have been expanded and redrawn as FIGURE 6. Referring to FIGURE 6, the data receivers are shown receiving a six bit character code. The six lines supplying the code to the data receivers are indicated in FIGURE 6 by their weighted binary notation; that is, the lines are designated $2^0$, $2^1$, $2^2$, $2^3$, $2^4$, and $2^5$. The six bit character received by the data receivers are applied to the special character decode network 53 of the printer control logic section 14. As mentioned previously, one of the special characters that has a unique meaning in the system of the present invention is designated the "Escape Character." The Escape Character is defined as a binary "one" in each of the six bit positions of the character code. The special character decode 53 receiving the six bit character from the data receivers will recognize the Escape Character and will give special consideration to the character following the Escape Character. If the character following the Escape Character is of the coded configuration 10XXXX, the second character is interpreted as a "Skip Character." In prior art printing systems, characters are received from the external user system and stored in a buffer for subsequent application to the printer mechanism. When it is desired that a "Space" be inserted in a particular column of a line of print, a specific "space character" code is sent from the external user system causing the buffering system of the printer to skip a space in the indicated column. In many instances, particularly when there are as many as 136 characters in a single line of print, the need for numerous "spaces" becomes evident. Thus, in prior art printing systems, the external user system must provide the printer system with a "space" character for each space to be provided in the print line. In the many instances requiring columns of printed information, the prior art printing system requires a great deal of time and supervision by the data process system to insert the requisite number of spaces between columns. The printer system of the present application enables, through the expediency of a unique code sequence, the printer system to skip a number of columns upon receipt of a single "skip column" code. Thus, when the data receivers transmit a received character to the special character decode 53, and the special character is decoded as an Escape Character, and when the second character received is of the form 10XXXX, that second character is interpreted as a skip code. The number of spaces to be skipped are contained within the skip code and are represented by the four least significant bit positions in the six bit codes. Thus, the skipped code 10XXXX indicates to the system that the number of columns to be skipped is the number represented by the decoded XXXX. The number code used for the number of columns to be skipped in the skip code may vary considerably; however, the following assignment of weights to the respective bit positions has been found to operate most efficiently when 136 print columns are used:

| | | |
|---|---|---|
| | | $2^0$ bit true = 8 spaces |
| $2^3$ $2^2$ $2^1$ $2^0$ | | $2^1$ bit true = 16 spaces |
| 1 0 X X X X | | $2^2$ bit true = 32 spaces |
| | | $2^3$ bit true = 64 spaces |

With the above assignment of weights to the corresponding bit positions, any number of spaces may be skipped in a line of print up to 120 spaces in increments of eight. The implementation of this concept is shown in FIGURE 6 by the application of a signal FCSK (column skip signal) to a plurality of conjunctive gates. These gates 140, 141, 142, and 143 are each connected to the data receivers and are connected to the four least significant bits of the six bit code applied to the data receiver. The gate 140 receives the bit from the $2^3$ position; gate 141 receives the bit from the $2^2$ position; gate 142 receives the bit from the $2^1$ position; gate 143 receives the bit from the $2^0$ position. The appearance of a "true" condition on any of the four least significant bit positions $2^0$–$2^3$ will result in an application of an appropriate four bit code to the address counter 85 through a decode and increment circuit as shown in FIGURE 6. The address counter, operating as previously described, is forced to increment by the number of spaces indicated in the weighted four bit code of the least significant four bits of the skip code.

The further illustrate the concept of the skip code, the following sequence will be useful:

| Digit Position | $2^5$ | $2^4$ | $2^3$ | $2^2$ | $2^1$ | $2^0$ |
|---|---|---|---|---|---|---|
| Receive code | 1 | 1 | 1 | 1 | 1 | 1 |
| | decodes as escape character | | | | | |
| Receive code | 1 | 0 | X | X | X | X |
| | decode as skip character | | | | | |

Increment address counter in accordance with XXXX as follows:

0001 = 8 spaces
0010 = 16 spaces
0100 = 32 spaces
1000 = 64 spaces
(or any combination of above)

Prior art printer systems normally have a maintenance panel with a plurality of switches to enable the operator to test the various subsystems and components of the printer system. A particular difficulty encountered in high speed printing systems using a rotating drum is the alignment of the print hammers so that all of the characters in a line of print do not vary upwardly or downwardly from the print line. In prior art printer systems, maintenance switches are provided to enable a line of print to be printed so that the operator may adjust the hammer alignment; however, the alignment procedure thus encountered requires a substantial amount of time and labor to effect proper adjustment. The ability of a printer system to print, off-line and in response to maintenance panel direction, a repetitive pattern of characters greatly reduces the time required to properly adjust hammer alignment. Accordingly, the printer system of the present invention provides, in addition to the normal maintenance panel switches, a plurality of switches intended to permit not only a line of predetermined characters to be printed but also a line of predetermined character patterns. For example, a pattern such as "123—123" or "123123 space" are particularly useful in determining proper hammer alignment. Prior art printer systems would require the loading of each character and each space in order to obtain the repetitive pattern. To more fully understand the concept of the repetitive pattern provisions afforded by the maintenance panel of the present invention, certain of the components of FIGURES 2, 3, and 4 have been redrawn in proper functional relationship and expanded to somewhat more detail in FIGURE 7.

Figure 7:
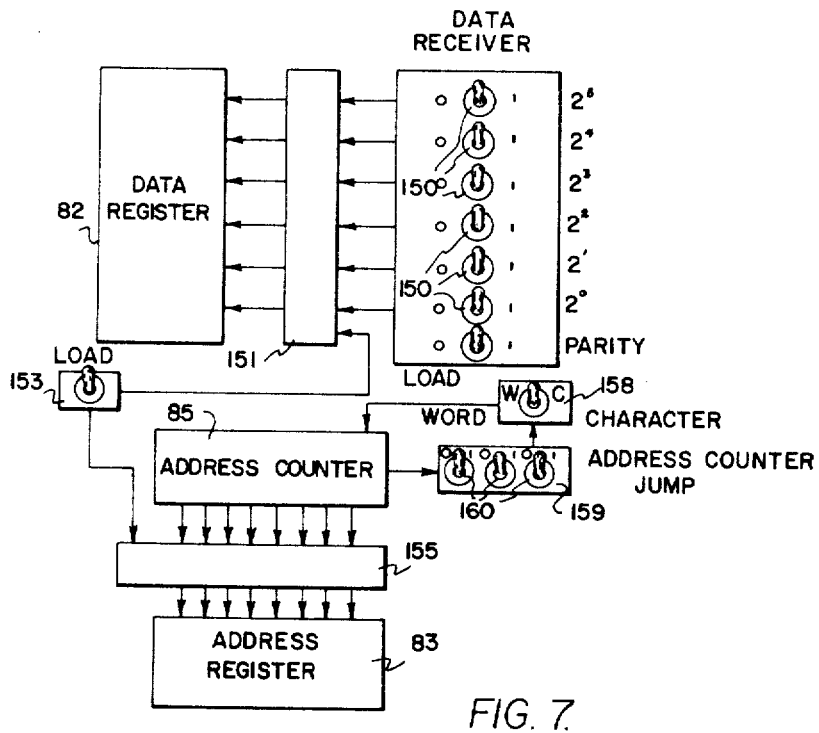
FIGURE 7 is a schematic block diagram showing portions of FIGURES 2, 3, and 4 in greater detail useful for describing the repetitive character sequencing of the present invention.

Referring to FIGURE 7, the data receiver shown therein is indicated as containing a plurality of switches 150 each representing one bit of the seven bit code normally received by the data receiver from the external user system. In FIGURE 7, the respective switches are labeled in accordance with the weighted binary position of the corresponding bit. Thus, the switches are labeled $2^5$–$2^0$ and "parity". The code normally received by the data receiver may be simulated by positioning the various switches 150 to either the "0" position or the "1" position. The code, thus derived, is applied through a gate 151 to the data register 82 in a manner similar to that occurring in the normal loading of data into the data register. The gate 151 applies the six bit character code to the data register only after the receipt of a gating signal applied thereto. To provide a simulated load signal, a load switch 153 is provided which, when actuated by the operator, permits the six bit character applied to the gate 151 to pass to the data register. The same load signal from the load switch 153 is applied to a gate 155 to admit the contents of the address counter 85 to the address register 83. The address counter is incremented in the normal operating fashion (i.e.: the address counter counts "one" for each address loaded into the address register). As long as the load switch 153 remains in a closed position, the code entered by the switches 150 in the data receiver will continue to be placed in the data register 82 and the addresses in the address counter provided to the address register will be augmented by one until the delay line buffer is full. The subsequent printing operation would thus print a continuous line of characters designated by the six bit code entered into the data receiver by the switches 150. However, to permit the insertion of a repetitive sequence of characters, a load word-character switch 158 is provided which inserts an address counter jump switch 159 into the address counter circuit. The address counter jump switch comprises three switches 160 each of which may be positioned in a binary "0" or "1" position. The three bit code thus applied to the address counter 85 causes the counter to skip counts in increments of eight. Thus, when a character is loaded into the data receiver by the switches 150, and the load switch 153 is actuated, the character is loaded into the data register and the addresses simultaneously being loaded into the address register follow a sequence of every eighth address. The specific starting address for the address counter (which normally would be reset to zero) is determined by the three bit code selected by the switches 160. The three bit code may be selected to enter the character in the data receiver at an address beginning with 0–7 (corresponding to print columns 1–8). The interpretation of the three bit code provided by the switch settings of switches 160 is a simple binary code; however, to further illustrate the effect of the code, the following table may be illustrative:

| Bit Configuration of switches 160 | Column of First Character | Characters Printed in Columns |
|---|---|---|
| 000 | 8 | 8, 16, 24, ... 136 |
| 001 | 1 | 1, 9, 17, ... |
| 010 | 2 | 2, 10, 18, ... |
| 011 | 3 | 3, 11, 19, ... |
| 100 | 4 | 4, 12, 20, ... |
| 101 | 5 | 5, 13, 21, ... |
| 110 | 6 | 6, 14, 22, ... |
| 111 | 7 | 7, 15, 23, ... |

The sequence followed during the test loading of a repetitive character sequence may be described as follows: the data receiver switches 150 may be appropriately positioned to represent an alphanumeric character "1," and the address counter jump switches 160 may be positioned in a binary configuration 001. The load switch 153 may then be depressed, and the character "1" is then loaded into the data register through the gate 151 simultaneously with the address "one," then loaded again with the address counter skipping its count to "9," loaded again with the address counter skipped to "seventeen," etc. This process continues until the address counter has counted to 136 and the alphanumeric character "1" has been inserted in the data register with corresponding addresses in the address register of one, nine, seventeen, etc. . . . The alphanumeric character "2" then may be entered in the data receiver switches 150 and the address counter jump switches 160 positioned to provide a binary code of 010. The load switch 153 is again actuated and the alphanumeric character "2" is entered into the data register along with the addresses "two," "ten," and "eighteen" until all of the addresses available in the address counter are utilized. The process is then repeated for the alphanumeric "3" with the address counter jump switches 160 positioned to provide a binary code of 011. The alphanumeric code "1" is then entered into the data register again with the exception that the address counter jump switches 160 are now positioned to provide a binary code of 100. This process is continued until all of the eight possible bit configurations of the address counter jump switches 160 have been utilized. When the print cycle is then implemented, the printer system will print repetitive sequences of characters, in the example chosen for illustration, "1231231." It may thus be seen that any desired sequence of characters may be entered into the data receiver by the utilization of the data receiver switches 150, and the repetitive nature of that character and subsequently entered characters may be determined by appropriately selecting the address counter jump switches 160. The resulting repetitive patterns provided by the printer system greatly reduce the time necessary for proper adjustment of the printer hammers.

The operation of the system of the present invention may conveniently be approached by first considering the various modes of operation in relation to the count on the program counter. The program counter is a three bit counter that provides 7 discrete program counts, various groups of which define certain functional modes of operation. Program counts 0–3 may conveniently be grouped into a functional mode which will be called the input/output mode. The program counts 4 and 5 may conveniently be referred to as the data receive mode. Program count 6 will be referred to as a waiting mode, and program count 7 may be interpreted as a print and slew start mode.

Figure 8:
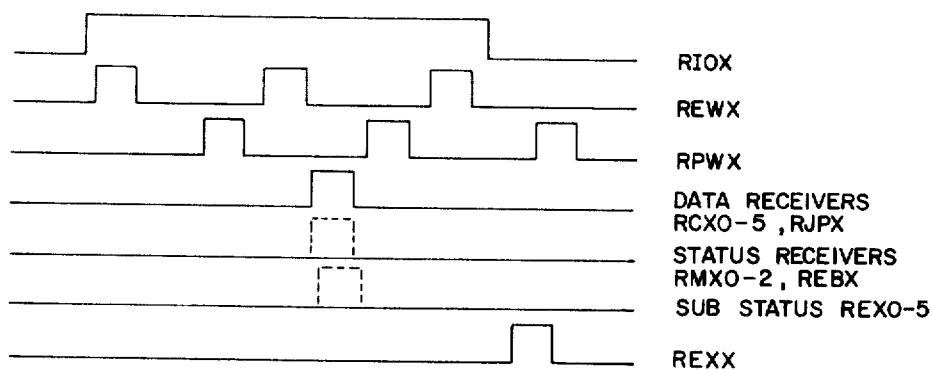
FIGURE 8 is a simplified timing diagram useful for illustrating an appropriate timing sequence in connection with the operation of the embodiment chosen for illustration.

An abbreviated review of the timing of the various modes described above may be useful in understanding the flow diagram to be discussed later. To facilitate the description of the operation of the system of the present invention, codes have been utilized to refer to certain components such as receivers, clocks, decodes, etc. These various components will generally have a unique code symbol, such as RIOX for the input/output receiver. However, to facilitate the description and to more clearly describe the operation of the present system, the symbols used to represent the various components will also be used to represent the signals received by, or provided by, those components. Thus, an output write clock signal will be referred to as REWX even though the symbol is also used, in some instances, to represent the output write clock receiver. Another convention that will be used to facilitate the description of operation is the use of the terminology "true" and "false." As is well known in the data processing art, terminology such as the terms "true" and "false" are generally used to indicate opposite conditions of a binary state. Thus, the word "true" may be used to indicate that a binary "1" exists, or that a particular voltage amplitude exists. It will be understood that the reference herein to the terms "true" and "false" are intended only to convey the state of a signal or a component opposite to the state of that signal or component when it is "false." FIGURE 8 is a simplified timing diagram illustrating the timing relationship among the various information pulses being delivered to and received from the external user system. The input/output receiver RIOX becomes true upon receipt of an input/output signal from the external user system. The printer system subsequently provides an output clock signal REWX to the external user system to indicate that the printer system is available for receiving print information. The external user system returns with an input write clock signal RPWX to inform the printer system that data is to follow. The input/output sequence provided by the pulses resulting in the receiver signals RIOX, REWX, and RPWX are not necessary to practice the invention; however, the signals, and responses thereto, represent an embodiment chosen for illustration to demonstrate an input/output sequence whereby data and command codes may be received by the printer system. After the receipt of the input write clock signal and the setting of the input write clock receiver RPWX, the printer system has been informed that print information is to follow. Subsequently, data receivers RCX0–5 and parity receiver RJPX (data and parity receivers of the input/output interface) assume a signal level depending on the receipt of the appropriate data and command code from the external user system over the 6 data lines and the parity line. In FIGURE 8, only one timing line is shown for all of the data and parity receivers.

During the printing operation of the present printer system, the status receivers RMX0-2 and REBX (major status network of the input/output interface) may assume a state depending on the particular status of the system, and the substatus receivers REX0–5 (substatus network of the input/output interface) will assume a state indicating the substatus of the printer system. The transfer of information to the printer system in the form of print character and command codes, and the transfer of status information to the external user system continues until an end data transfer signal is received from the external user system and an end data transfer receiver REXX (program counter of printer control logic section) goes true indicating that no further transfer of information from the external user system is forthcoming.

Keeping in mind the above brief description of the general input timing sequence between the external user system and the printer system of the present invention, a more detailed description will now be given of the operation of the present system with the aid of flow diagrams. Since the sequence of operations of the printer system depends on the count of the program counter, the description of operation will follow the program count. The logic names for the flip-flops in the counter are FP00, FP01, and FP02. The count is in Gray Code rather than binary, with the following sequence:

| FP02 | FP01 | FP00 | "Program Count" |
|---|---|---|---|
| 0 | 0 | 0 | 0 |
| 0 | 0 | 1 | 1 |
| 0 | 1 | 1 | 2 |
| 0 | 1 | 0 | 3 |
| 1 | 1 | 0 | 4 |
| 1 | 1 | 1 | 5 |
| 1 | 0 | 1 | 6 |
| 1 | 0 | 0 | 7 |

Figure 9:
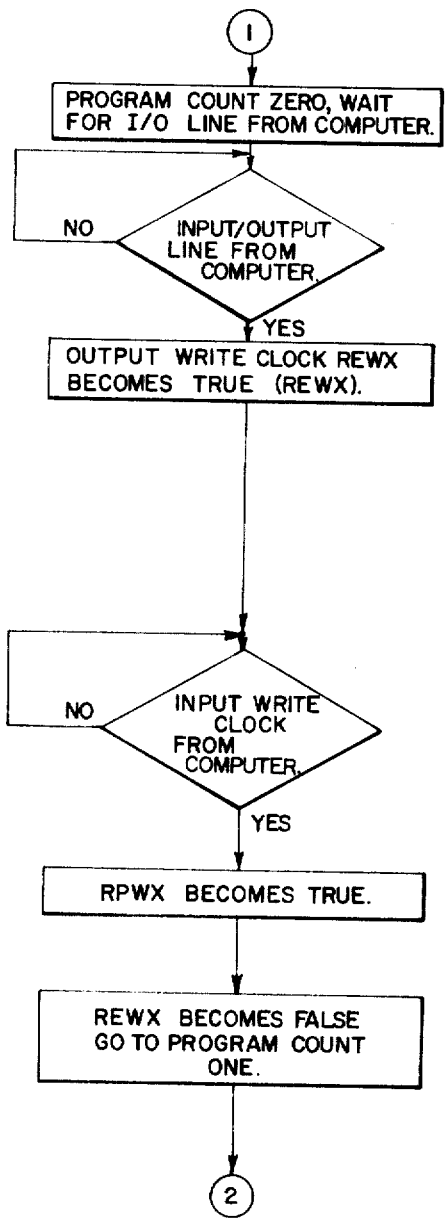
FIGURE 9 is a flow diagram illustrating the operation of the system of the present invention during program count 0.

A description of the functions performed during the various program counts follows:

*Program count 0—Refer to FIGURE 9*

The printer is in a Rest state during most of this count. No printing will be done, and no new slew information remains to be acted upon. The printer can, and normally will be, slewing at this time during a print operation. However, if a Slew Only command (a command having only slew information therein) occurs during slew from a previous command, the printer will not revert to program count zero until the previous Slew command is terminated. During this program count, an input/output sequence may be initiated by the external-user system. The output write clock (REWX) becomes true. Program count 0 remains true until an answering pulse input write clock (RPWX) is received from the external-user system. When RPWX becomes true, the program counter switches to program count 1.

Figure 10:
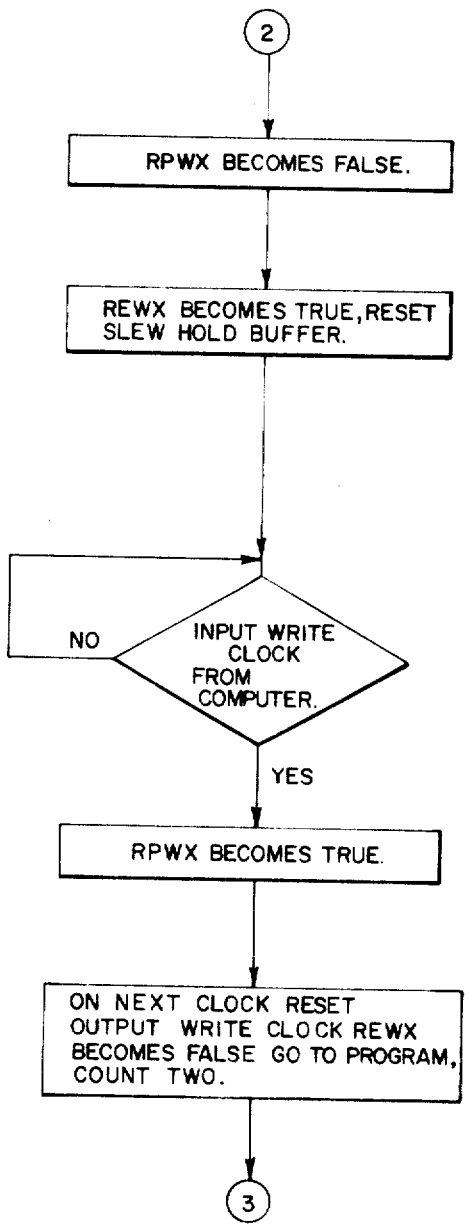
FIGURE 10 is a flow diagram illustrating the operation of the system of the present invention during program count 1.

*Program count 1—Refer to FIGURE 10*

During this time the slew buffer (the Slew Control Section) is reset and REWX becomes true for the 2nd time to request the command or operation code from the external user system. The operation code is applied to the receivers (RCX0–RCX5) and RPWX is set. At this time, program count 2 becomes true.

Figure 11:
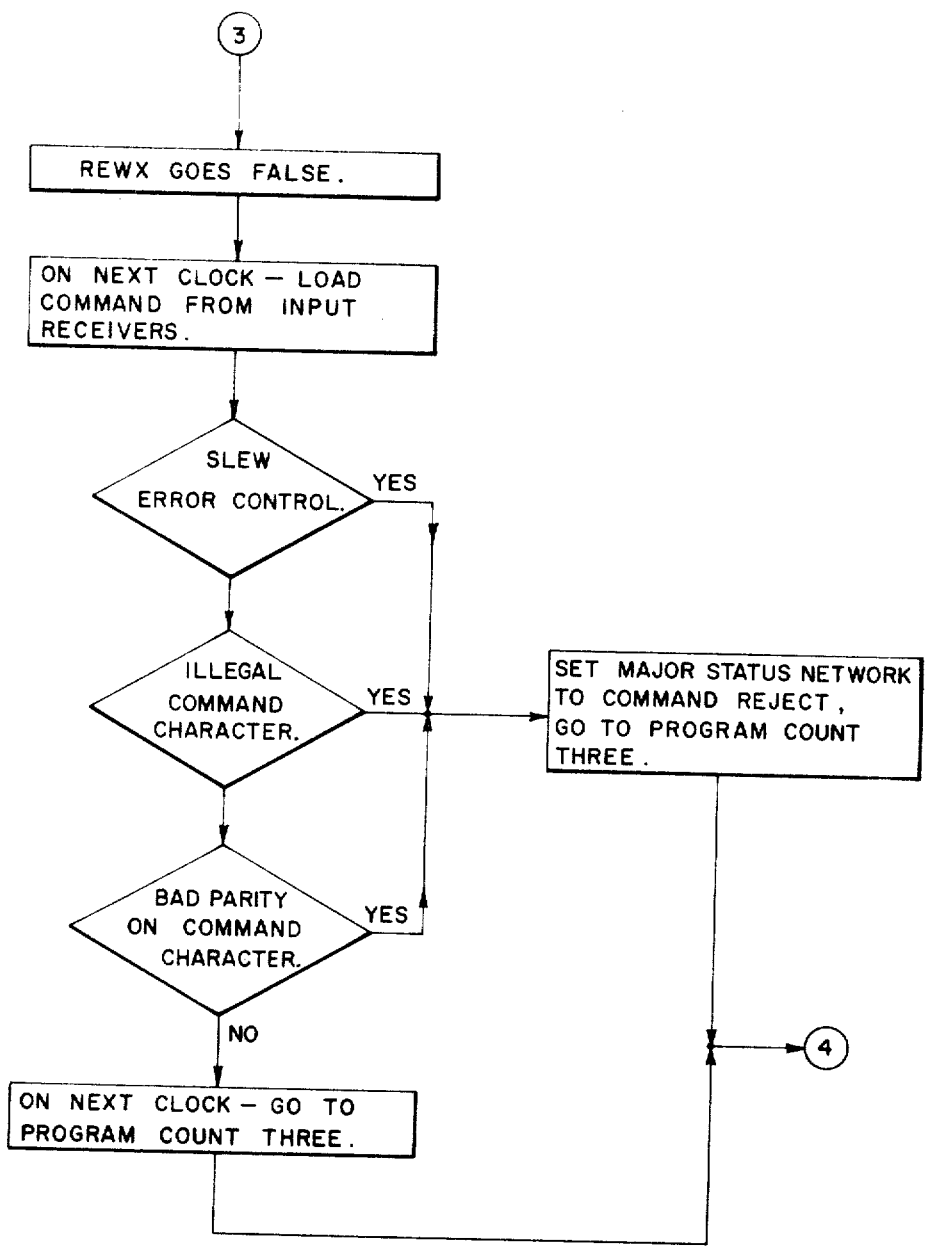
FIGURE 11 is a flow diagram illustrating the operation of the system of the present invention during program count 2.

*Program count 2—Refer to FIGURE 11*

During this program count the operation code is processed, checked for validity and checked for parity error. The proper print and/or slew control flip-flops are set. After the operation code information is processed, program count 3 becomes true.

Figure 12:
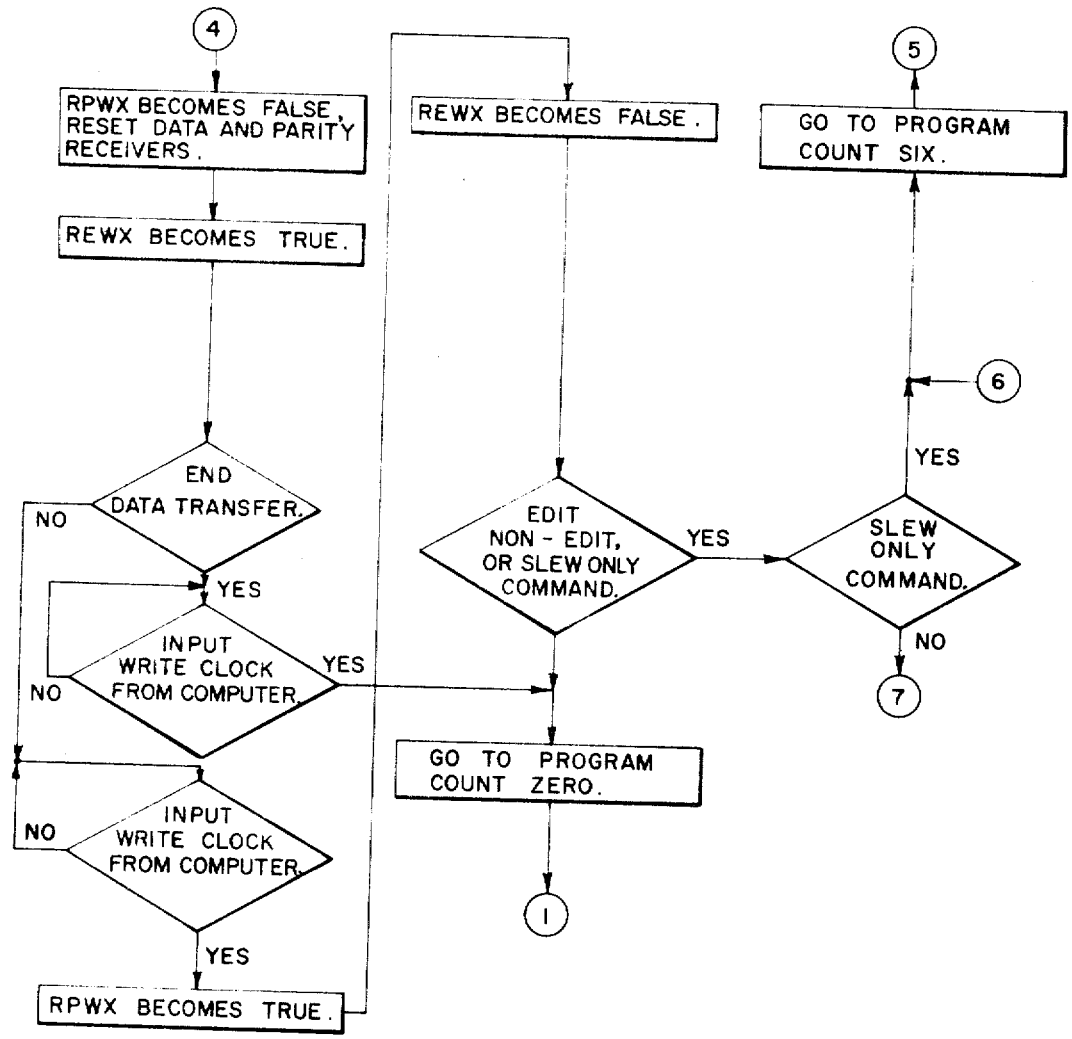
FIGURE 12 is a flow diagram illustrating the operation of the system of the present invention during program count 3.

*Program count 3—Refer to FIGURE 12*

During this program count, the status conditions are provided by the major and substatus networks and REWX becomes true. The subsequent program count is determined by the command received, as follows: If the command is a Print command, the next program count will be "4." If it is a Slew Only command the next program count will be "6." Finally, if the command is either a Request Status or Reset Status command, the next program count will be "0." If an End Data Transfer is received before the input write clock, the next program count will be "0."

Figure 13:
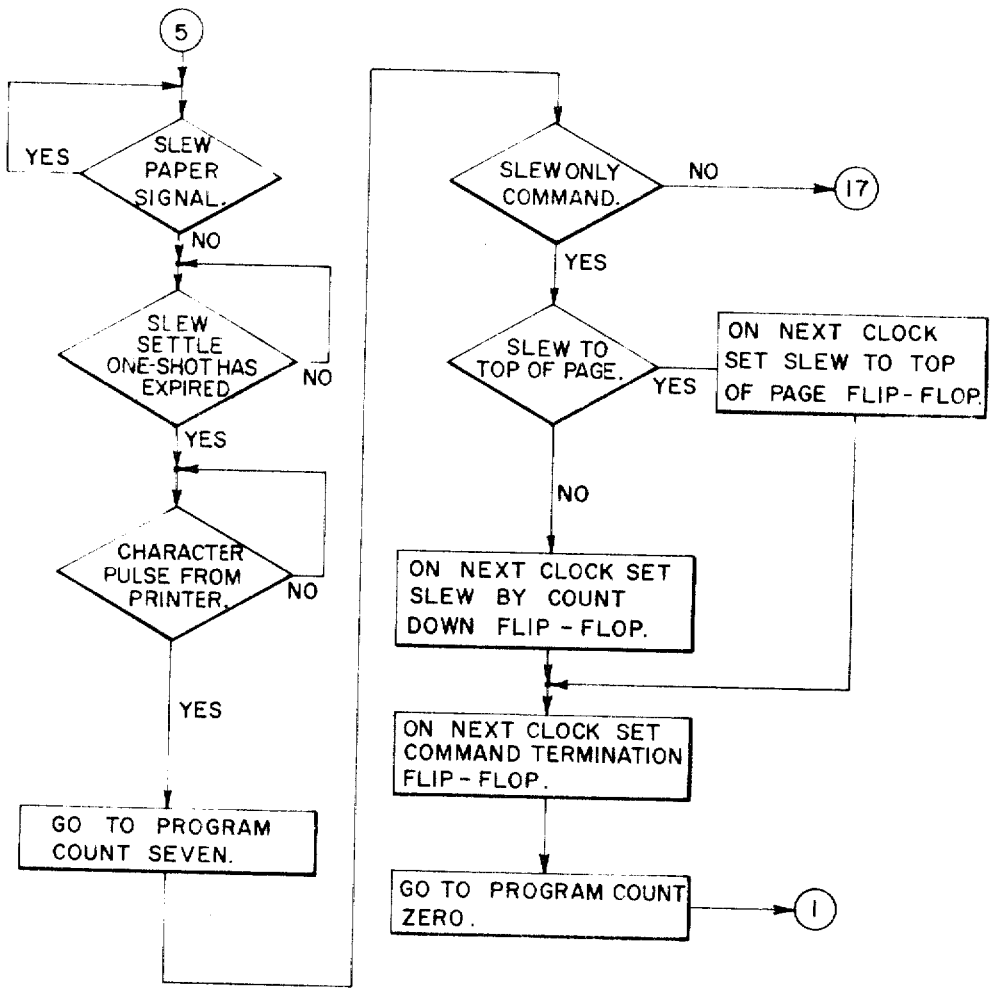
FIGURE 13 is a flow diagram illustrating the operation of the system of the present invention during program count 6.

*Jump to program count 6—Refer to FIGURE 13*

When a Slew only command is sent, a flip-flop of the command decode network of the printer control section is set to store the command until the previous slew operation has ceased. The program counter jumps to program count 6 when the input write clock receiver RPWX becomes true during program count 3, and will remain there until the completion of the previous slew operation. Then, when the first character pulse from the print drum appears, the program counter is stepped to program count 7.

*"Slew only" in program count 7—Refer to FIGURE 13*

When the Slew Only flip-flop has been set and program count 7 is reached, the appropriate slew information is loaded, paper slewing begins, and a Command Terminate signal is sent to the external user system. The program counter is set to program count 0, the Slew Only flip-flop is reset, and the printer system is ready for another input/output sequence.

Figure 14:
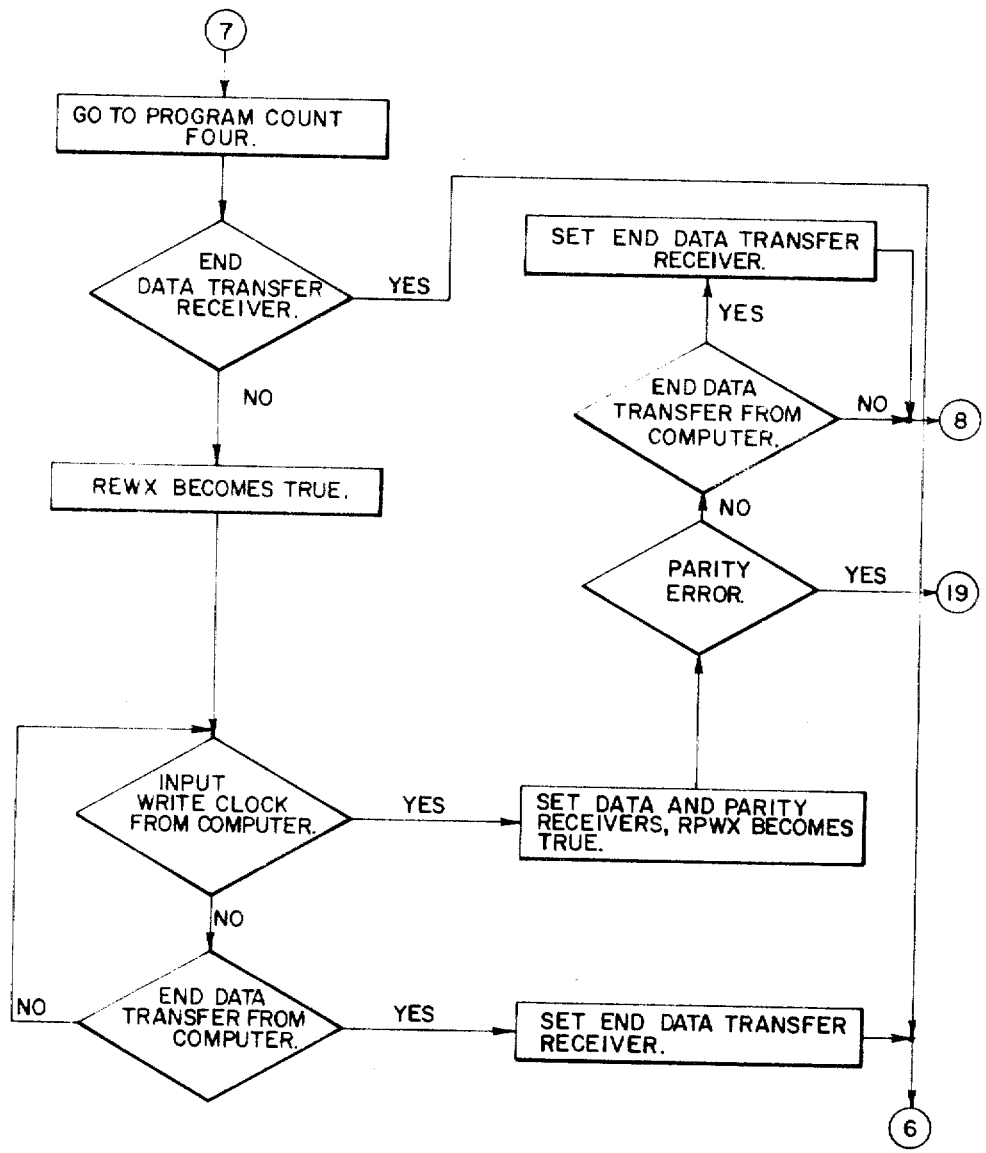
FIGURE 14 is a flow diagram illustrating the operation of the system of the present invention during program count 4.

*Program count 4—Refer to FIGURE 14*

If during the input/output sequence a Print Edit or Print non-edit command is sent, the next input write clock pulse RPWX causes the program counter to be set to program count 4. The output write clock REWX is made true again, and the external user system interprets its occurrence as a request for a character. A character is sent on the information lines and is received by the data receivers (RCX0–RCX5 and RJPX); the input write clock receiver RPWX becomes true. Upon receipt of a character, the program counter goes to program count 5, and a delay is imposed upon the printer to prohibit the printer from requesting another character for at least the time necessary to clear receivers prior to receiving subsequent characters and commands.

*Program count 5—Refer to FIGURES 15, 16, and 17*

During program count 5, the character is loaded in the delay line buffer of the buffer logic section or, if it is a special character, it is decoded in the special character decode network of the printer control section and processed accordingly. If the character is a Skip Character, the address counter is incremented by a number corresponding to the binary configuration of the four least significant bits of the Skip Character multiplied by eight as previously described.

*Program count 4–5 repeat cycle—Refer to FIGURES 14, 15, 16, and 17*

As soon as the character is loaded and the delay imposed upon the printer system has expired, the program counter goes back to program count 4. The output write clock REWX becomes true, and the next character is sent by the external user system. The above "repeat cycle" sequence is continued until all characters have been received.

*Program count 6—Refer to FIGURE 12*

When the last character has been sent by the external user system, a Slew character (Escape followed by a 0XXXXX) or an End Data Transfer Signal (REXX) is sent to the printer system. At this time, the program counter goes to program count 6 to wait for the completion of the previous slew operation.

*"Print" in program count 7—Refer to FIGURES 13 and 18*

At the termination of the previous slew, the program counter goes to program count 7. As soon as the first character pulse is detected, the recirculating information in the buffer is compared with the character coming under the print hammers, and the appropriate hammer drivers are set as previously described. At the end of the character cycle, the hammer drivers that were set are fired. Thus, as each character appears, it is compared with the information in the buffer, the proper hammers are set and then fired at the end of the cycle. This process is continued until all characters have been printed on that line.

*End of print cycle—Refer to FIGURES 19 and 20*

As soon as all characters have been printed, paper slewing begins, if a slew command has been received, and the delay lines are cleared during the time the loaded characters counter counts 162 clock level zeros (sufficient time to insure that address and data buffers are cleared before proceeding. Upon completion of the clear cycle, a Command Terminate signal is sent to the external user system. The program counter is set to zero, and the system reverts to the ready state.

While the principles of the invention have now been made clear in the illustrated embodiments, there will be immediately obvious to those skilled in the art many modifications in structure, arrangement, proportion, elements, materials and components, used in the practice of the invention and otherwise, which are particularly adapted for specific environments and operating requirements, without departing from those principles. The appended claims are therefore meant to cover and embrace any such modifications, within the limits only of the spirit and scope of the invention.

We claim:

1. In a printer system, means for storing information for printing in a plurality of print columns, including: a recirculating data buffer for receiving and storing information to be printed in said print columns, and a recirculating address buffer synchronized with said data buffer for receiving and storing addresses corresponding to the print columns in which said information is to be printed.

2. In a printer system, means for storing information for printing in a plurality of print columns, including: a data buffer and a data register connected in a recirculating data path for receiving and storing information to be printed in said print columns, an address buffer and an address register connected in a recirculating address path synchronized with said recirculating data path for receiving and storing addresses corresponding to the print columns in which said information is to be printed.

3. In a printer system, means for storing information for printing in a plurality of print columns, including: a recirculating data buffer for receiving and storing information to be printed in said print columns, a recirculating address buffer and an address register connected in a recirculating path synchronized with said data buffer for receiving and storing addresses, and an address counter connected to said address register for supplying addresses thereto corresponding to the print columns in which said information is to be printed.

4. In a printer system, means for storing information for printing in a plurality of print columns, including: a data buffer and a data register connected in a recirculating data path for receiving and storing information to be printed in said print columns, an address buffer and an address register connected in a recirculating address path synchronized with said recirculating data path for receiving and storing addresses, an address counter connected to said address register for supplying addresses thereto corresponding to the print columns in which said information is to be printed.

5. In a printer system, means for storing information for printing in a plurality of print columns, including: a recirculating delay line data buffer for receiving and storing information to be printed in said print columns, a recirculating delay line address buffer synchronized with said data buffer for receiving and storing addresses corresponding to the print columns in which said information is to be printed.

6. The device defined by claim 5 wherein said delay line data buffer and delay line address buffer are each magnetostrictive delay lines.

7. In a printer system, means for storing information for printing in a plurality of print columns, including: a delay line data buffer and data register connected in a recirculating data path for receiving and storing information to be printed in said print columns, a delay line address buffer and an address register connected in a recirculating address path synchronized with said recirculating data path for receiving and storing addresses corresponding to the print columns in which said information is to be printed.

8. The device defined by claim 7 wherein said delay line data buffer and delay line address buffer are each magnetostrictive delay lines.

9. In a printer system, means for storing information for printing in a plurality of print columns, including: a delay line data buffer and a data register connected in a recirculating data path for receiving and storing information to be printed in said print columns, a delay line address buffer and an address register connected in a recirculating address path synchronized with said recirculating data path for receiving and storing addresses, and an address counter connected to said address register for supplying addresses thereto corresponding to the print columns in which said data is to be printed.

10. In a printer system having a rotating print drum with characters arranged in a plurality of print columns on the periphery thereof, and having a plurality of print hammers arranged adjacent said drum for striking said characters, a data buffer and a data register connected in a recirculating data path, a plurality of data receivers for connecting to an external user system to receive a character code, means connecting said data receivers to said data register for transferring said character code into said recirculating data path, an address buffer and an address register connected in a recirculating address path synchronized with said recirculating data path, and an address counter connected to said address register for supplying an address thereto corresponding to the print column in which said character is to be printed.

11. In a printer system having a rotating print drum with characters arranged in a plurality of print columns on the periphery thereof, and having a plurality of print hammers arranged adjacent said drum for striking said characters, a data buffer and a data register connected in a recirculating data path, a plurality of data receivers for connecting to an external user system to receive a character code, means connecting said data receivers to said data register for transferring said character code into said recirculating data path, an address buffer and an address register connected in a recirculating address path synchronized with said recirculating data path, an address counter connected to said address register for supplying an address thereto corresponding to the print column in which said character is to be printed, and means responsive to a load signal for transferring said character code into said data register while simultaneously transferring said address into said address register.

12. In a printer system having a rotating print drum with characters arranged in a plurality of print columns on the periphery thereof, and having a plurality of print hammers arranged adjacent said drum for striking said characters, a data buffer and a data register connected in a recirculating data path having a plurality of time slots each of sufficient duration to accept a character code and an identification bit, a plurality of data receivers for connecting to an external user system to receive a character code, means connecting said data receivers to said data register for transferring said character code into said recirculating data path, an address buffer and an address register connected in a recirculating address path synchronized with said recirculating data path and having a plurality of time slots each of sufficient duration to accept a print column address, an address counter connected to said address register for supplying an address thereto corresponding to the print column in which said character is to be printed, and means responsive to a load signal for transferring said character code into said data register while simultaneously transferring said address into said address register.

13. In a printer system having a rotating print drum with characters arranged in a plurality of print columns on the periphery thereof, and having a plurality of print hammers arranged adjacent said drum for striking said characters, a data buffer and a data register connected in a recirculating data path having a plurality of time slots each of sufficient duration to accept a character code and an identification bit, a plurality of data receivers for connecting to an external user system to receive a character code, means connecting said data receivers to said data register for transferring said character code into said recirculating data path, an address buffer and an address register connected in a recirculating address path synchronized with said recirculating data path and having a plurality of time slots each of sufficient duration to accept a print column address, an address counter connected to said address register for supplying an address thereto corresponding to the print column in which said character is to be printed, and means responsive to a given logic condition of said identification bit for transferring said character code into said data register while simultaneously transferring said print column address into said address register.

14. In a printer system having a rotating print drum with characters arranged in a plurality of print columns on the periphery thereof, and having a plurality of print hammers arranged adjacent said drum for striking said characters; a code generating means responsive to the rotation of said print drum for providing a print drum character code corresponding to a character on said drum coming into printing position, a comparison circuit, means supplying said print drum character code to said comparison circuit, a data buffer and a data register connected in a recirculating data path for receiving and storing character codes, means connecting said data register to said comparison circuit for supplying all character codes circulating in said data path to said comparison circuit, an address buffer and an address register connected in a recirculating address path synchronized with said recirculating data path for receiving and storing addresses corresponding to the print columns in which said characters are to be printed, said comparison circuit responsive to the simultaneous receipt of identical character codes from the code generating means and from the data register for generating a gating signal.

15. In a printer system having a rotating print drum with characters arranged in a plurality of print columns on the periphery thereof, and having a plurality of print hammers arranged adjacent said drum for striking said characters; a code generating means responsive to the rotation of said print drum for providing a print drum character code corresponding to a character on said drum coming into printing position, a comparison circuit, means supplying said print drum character code to said comparison circuit, a data buffer and a data register connected in a recirculating data path for receiving and storing character codes, means connecting said data register to said comparison circuit for supplying all character codes circulating in said data path to said comparison circuit, an address buffer and an address register connected in a recirculating address path synchronized with said recirculating data path for receiving and storing addresses corresponding to the print columns in which said characters are to be printed, said comparison circuit responsive to the simultaneous receipt of identical character codes from the code generating means and from the data register for generating a gating signal, a matrix decoder for receiving addresses from said address register and energizing print hammers corresponding to the print columns represented by said addresses, and means responsive to said gating signal for transferring the address in said address register to said matrix decoder.

16. In a printer system, a plurality of data receivers for receiving coded characters and commands, a decoder connected to said data receivers for receiving coded commands therefrom, said decoder responsive to a predetermined command code for generating a skip count signal, an address counter for generating column address codes for each coded character received by said data receivers, said address counter normally incrementing one count for each coded character received by said data receivers, and means responsive to said skip count signal for forcing said address counter to increment more than one count for each coded character received by said data receivers.

17. In a printer system, a plurality of data receivers for receiving coded characters and commands in the form of a plurality of binary digits, a decoder connected to said data receivers for receiving coded commands therefrom, said decoder responsive to a predetermined configuration of binary digits for generating a skip count signal, an address counter for generating column address codes for each coded character received by said data receivers, said address counter normally incrementing one count for each coded character received by said data receivers, means connected to said address counter responsive to said skip count signal for forcing said address counter to increment more than one count for each coded character received by said data receivers.

18. In a printer system, a plurality of data receivers for receiving coded characters and commands, a decoder connected to said data receivers for receiving coded commands therefrom, said decoder responsive to a predetermined command code for generating a skip count signal, an address counter for generating column address codes for each coded character received by said data receivers, said address counter normally incrementing one count for each coded character received by said data receivers, and means responsive to said skip count signal for forcing said address counter to increment a number of counts determined by a portion of said predetermined command code for each coded character received by said data receivers.

19. In a printer system, a plurality of data receivers for receiving coded characters and commands in the form of a plurality of binary digits, a decoder connected to said data receivers for receiving coded commands therefrom, said decoder responsive to a predetermined configuration of binary digits for generating a skip count signal, an address counter for generating column address codes for each coded character received by said data receivers, said address counter normally incrementing one count for each coded character received by said data receiver, means responsive to said skip count signal for forcing said address counter to increment a number of counts determined by a portion of said predetermined configuration of binary digits for each coded character received by said data receivers.

20. In a printer system, a plurality of data receivers for receiving coded characters and commands in the form of a plurality of binary digits, a decoder connected to said data receivers for receiving coded commands therefrom, said decoder responsive to a predetermined configuration of binary digits for generating a skip count signal, an address counter for generating column address codes for each coded character received by said data receivers, said address counter normally incrementing one count for each coded character received by said data receivers, means responsive to said skip count signal for forcing said address counter to increment a number of counts determined by the bit configuration of at least the two least significant bits of said predetermined configuration of binary digits.

21. In a printer system for printing characters in a plurality of print columns, a plurality of data receivers each adapted to receive one bit of a multiple bit character code, a plurality of manually-operable switches, each corresponding to a different one of said data receivers and each having an "0" position and a "1" position for inserting a binary "0" or "1" digit into the corresponding data receiver, a data buffer and a data register connected in a recirculating data path for receiving and storing character codes from said data receivers, an address buffer and an address register connected in a recirculating address path synchronized with said recirculating data path for receiving and storing addresses corresponding to the print columns in which characters represented by said character codes are to be printed, an address counter connected to said address register for supplying addresses thereto; said address counter normally incrementing one count for each character code received by said data register from said data receivers, a manually-operable test switch connected to said address counter for forcing said counter to increment more than one count for each character code received by said data register from said data receivers, and a plurality of manually-operable jump count switches connected to said address counter, each of said jump count switches having a "0" position and a "1" position, the binary code represented by the jump count switch positions determining the initial count of said address counter.

22. In a printer system; an address counter for generating print column addresses for characters to be printed, said counter normally incrementing one count for each character code received by said printer system, means for establishing a logical sequence of non-consecutive addresses to facilitate the generation of a repetitive pattern of print characters including a manually-operable test switch connected to said address counter for forcing said counter to increment more than one count for each character code received by said printer, and a plurality of manually-operable jump count switches connected to said address counter, each of said jump count switches having a "0" position and a "1" position, the binary code represented by the jump count switch positions determining the initial count of said address counter.

23. A printer system comprising: a data buffer and a data register connected in a recirculating data path for receiving and storing character codes, a plurality of data recivers for connecting to an external user system to receive character codes, means connecting said data receivers to said data register for transferring said character codes into said recirculating data path, an address buffer and an address register connected in a recirculating address path synchronized with said recirculating data path, an address counter connected to said address register for supplying addresses thereto corresponding to the print columns in which said characters are to be printed, a comparison circuit, a rotating print drum, code generating means responsive to the rotation of said print drum for providing a print drum character code corresponding to a character on said drum coming into printing position, means supplying said print drum character code to said comparison circuit, means connecting said data register to said comparison circuit for supplying all character codes circulating in said data path to said comparison circuit, said comparison circuit responsive to the simultaneous receipt of identical character codes from the code generating means and from the data register for generating a gating signal, a matrix decoder for receiving addresses from said address register and energizing print hammers corresponding to the print columns represented by said addresses, and means responsive to said gating signal for transferring the address in said address register to said matrix decoder.

References Cited

UNITED STATES PATENTS

| | | | |
|---|---|---|---|
| 2,850,566 | 9/1958 | Nelson | 340—172.5 X |
| 2,954,731 | 10/1960 | Durand et al. | 101—93 |

(Other references on following page)

| | | | |
|---|---|---|---|
| 3,107,342 | 10/1963 | Estrems et al. | 340—172.5 |
| 3,145,369 | 8/1964 | Perschy | 340—172.5 X |
| 3,153,776 | 10/1964 | Schwartz | 340—172.5 |
| 3,174,610 | 3/1965 | Barbagallo et al. | 340—172.5 X |
| 3,238,505 | 3/1966 | Shapiro et al. | 340—172.5 |
| 3,262,102 | 7/1966 | Gabor | 340—172.5 |
| 3,286,237 | 11/1966 | Kikuchi | 340—172.5 |

OTHER REFERENCES

E. M. McCormick, Digital Computer Primer, 1959, McGraw-Hill Book Co. Inc., pp. 81–84.

PAUL J. HENON, *Primary Examiner.*

ROBERT C. BAILEY, *Examiner.*

P. R. WOODS, *Assistant Examiner.*